United States Patent [19]
Aoki

[11] Patent Number: 6,094,315
[45] Date of Patent: Jul. 25, 2000

[54] IMAGE-FORMING OPTICAL SYSTEM

[75] Inventor: Norihiko Aoki, Fukushima, Japan

[73] Assignee: Olympus Optical Co., Ltd., Tokyo, Japan

[21] Appl. No.: 09/313,388

[22] Filed: May 18, 1999

[30] Foreign Application Priority Data

May 19, 1998 [JP] Japan ................................. 10-136845

[51] Int. Cl.[7] .............................. G02B 17/00; G02B 3/02; G02B 5/04
[52] U.S. Cl. .......................... 359/731; 359/720; 359/726; 359/727; 359/834
[58] Field of Search .................... 359/726–736, 359/720, 749, 753, 833, 834

[56] References Cited

U.S. PATENT DOCUMENTS

| | | | |
|---|---|---|---|
| 5,825,560 | 10/1998 | Ogura et al. | 359/822 |
| 5,963,376 | 10/1999 | Togino | 359/676 |
| 5,991,103 | 11/1999 | Togino | 359/834 |
| 5,995,291 | 11/1999 | Togino | 359/631 |

FOREIGN PATENT DOCUMENTS

| | | |
|---|---|---|
| 8-292368 | 11/1996 | Japan . |
| 8-292371 | 11/1996 | Japan . |
| 8-292372 | 11/1996 | Japan . |
| 9-90229 | 4/1997 | Japan . |
| 9-211331 | 8/1997 | Japan . |
| 9-222561 | 8/1997 | Japan . |
| 9-222563 | 8/1997 | Japan . |
| 9-258105 | 10/1997 | Japan . |
| 9-258106 | 10/1997 | Japan . |
| 10-20196 | 1/1998 | Japan . |

OTHER PUBLICATIONS

Patent Abstracts of Japan, 09005650, Jan. 1997, Keisuke.
Patent Abstracts of Japan, 07333505, Dec. 1995, Shigeo.

*Primary Examiner*—Georgia Epps
*Assistant Examiner*—David N. Spector
*Attorney, Agent, or Firm*—Pillsbury Madison & Sutro LLP

[57] ABSTRACT

A high-performance and low-cost image-forming optical system made compact and thin by folding an optical path using reflecting surfaces having power. The optical system has a plurality of reflecting surfaces having power. Among the reflecting surfaces, a reflecting surface (12) of negative power is placed closest to the object side, and a reflecting surface (22) of positive power is placed closer to the image side than the reflecting surface (12). At least one reflecting surface (13) is provided between the reflecting surface (12) and the reflecting surface (22). An axial principal ray (1) incident on the reflecting surface (13) satisfies the condition of $45° < |\theta|$, where $\theta$ is the angle formed between the axial principal ray and a line normal to the reflecting surface (13) in the decentration direction at a point where the axial principal ray (1) intersects the reflecting surface (13).

14 Claims, 20 Drawing Sheets

80 Objective optical system for observation
10 First prism
4 Low-pass filter
2 Stop
20 Second prism
81 Infrared cutoff filter
83 Image pickup surface
82 CCD
84 Cover member
85 Objective optical system for illumination
86 Light guide fiber bundle
79

IMAGE-FORMING OPTICAL SYSTEM

BACKGROUND OF THE INVENTION

The present invention relates to image-forming optical systems. More particularly, the present invention relates to a thin image-forming optical system with reflecting surfaces having power for use in apparatus using a small-sized image pickup device, e.g. video cameras, digital still cameras, and film scanners.

Recently, with the achievement of small-sized image pickup devices, image-forming optical systems for use in video cameras, digital still cameras, film scanners, etc. have also been required to be thin, compact, lightweight and low-cost optical systems.

In the case of a rotationally symmetric coaxial optical system, optical elements are arranged in the direction of the optical axis. Therefore, there is a limit to the reduction in thickness of the optical system. Thus, it is difficult to reduce the thickness of the optical system and to ensure the required performance at the same time. Meanwhile, the number of lens elements unavoidably increases because it is necessary to correct chromatic aberration produced by a rotationally symmetric refracting lens used in the optical system. Therefore, it is difficult to reduce the cost in the present state of the art. Under these circumstances, there have recently been proposed optical systems designed to be thin and compact in size by giving a power to a reflecting surface, which produces no chromatic aberration, and folding an optical path in the optical axis direction.

Japanese Patent Application Unexamined Publication Number [hereinafter referred to as "JP(A)"] 7-333505 proposes to reduce the thickness of an optical system by giving a power to a decentered reflecting surface and folding an optical path. In an example thereof, however, the number of constituent optical members is as large as five, and actual optical performance is unclear. No mention is made of the configuration of the reflecting surface.

JP(A) 8-292371, 9-5650 and 9-90229 each disclose an optical system in which an optical path is folded by a single prism or a plurality of mirrors integrated into a single block, and an image is relayed in the optical system to form a final image. In these conventional examples, however, the number of reflections increases because the image is relayed. Accordingly, surface accuracy errors and decentration accuracy errors are transferred while being added up. Consequently, the accuracy required for each surface becomes tight, causing the cost to increase unfavorably. The relay of the image also causes the overall volumetric capacity of the optical system to increase unfavorably. JP(A) 9-222563 discloses an example of an optical system that uses a plurality of prisms. However, because the optical system is arranged to relay an image, the cost increases and the optical system becomes large in size unfavorably for the same reasons as stated above.

JP(A) 9-211331 discloses an example of an optical system in which an optical path is folded by using a single prism to reduce the thickness and size of the optical system. However, the optical system is not satisfactorily corrected for aberrations.

JP(A) 8-292368, 8-292372, 9-222561, 9-258105 and 9-258106 all disclose examples of zoom lens systems. In these examples, however, the number of reflections is undesirably large because an image is relayed in a prism. Therefore, surface accuracy errors and decentration accuracy errors of reflecting surfaces are transferred while being added up, unfavorably. At the same time, the overall size of the optical system unavoidably increases, unfavorably.

JP(A) 10-20196 discloses an example of a two-unit zoom lens system having a positive front unit and a negative rear unit, in which the positive front unit comprises a prism of negative power placed on the object side of a stop and a prism of positive power placed on the image side of the stop. JP(A) 10-20196 also discloses an example in which the positive front unit, which comprises a prism of negative power and a prism of positive power, is divided into two to form a three-unit zoom lens system having a negative unit, a positive unit and a negative unit. However, the prisms used in these examples each have two transmitting surfaces and two reflecting surfaces, which are all independent surfaces. Therefore, a relatively wide space must be ensured for the prisms. In addition, the image plane is large in size in conformity to the Leica size film format. Accordingly, the prisms themselves become unavoidably large in size. In either of the examples of zoom lens systems, zooming is performed by moving the prisms. Accordingly, the decentration accuracy required for the reflecting surfaces becomes tight in order to maintain the required performance over the entire zooming range, resulting in an increase in the cost.

When a general refracting optical system is used to obtain a desired refracting power, chromatic aberration occurs at an interface surface thereof according to chromatic dispersion characteristics of an optical element. To correct the chromatic aberration and also correct other ray aberrations, the refracting optical system needs a large number of constituent elements, causing the cost to increase. In addition, because the optical path extends straight along the optical axis, the entire optical system undesirably lengthens in the direction of the optical axis, resulting in an unfavorably large-sized image pickup apparatus.

In decentered optical systems such as those described above in regard to the prior art, an imaged figure or the like is undesirably distorted and the correct shape cannot be reproduced unless the formed image is favorably corrected for aberrations, particularly rotationally asymmetric distortion.

SUMMARY OF THE INVENTION

In view of the above-described problems of the prior art, an object of the present invention is to provide a high-performance and low-cost image-forming optical system that is made compact and thin by folding an optical path using reflecting surfaces having power.

To attain the above-described object, the present invention provides an image-forming optical system that has a plurality of reflecting surfaces having power and a stop. An optical path is folded by the reflecting surfaces, and a light beam from an object point is led to an image plane to form an image thereon.

The plurality of reflecting surfaces include a first reflecting surface with a curved surface configuration having a negative power, and a second reflecting surface with a curved surface configuration having a positive power. The second reflecting surface is placed closer to the image plane than the first reflecting surface. The plurality of reflecting surfaces further include a third reflecting surface as at least one reflecting surface placed in an optical path between the first reflecting surface and the second reflecting surface.

The third reflecting surface has a configuration that satisfies the following condition (1):

$$45° < |\theta| \qquad (1)$$

where, when a light ray from the object center that passes through the center of the stop and reaches the center of the image plane is defined as an axial principal ray, θ is the angle formed between the axial principal ray and a line normal to the third reflecting surface in the decentration direction at a point where the axial principal ray intersects the third reflecting surface.

It is desirable that, among the reflecting surfaces having power, the first reflecting surface should be placed closest to the object side of the image-forming optical system.

It is also desirable for the first reflecting surface to have a configuration that satisfies the following condition (2):

$$|\Theta n|<45° \qquad (2)$$

where Θn is the angle formed between the axial principal ray and a line normal to the first reflecting surface in the decentration direction at a point where the axial principal ray intersects the first reflecting surface.

In addition, it is desirable for the second reflecting surface to have a configuration that satisfies the following condition (3):

$$|\Theta p|<45° \qquad (3)$$

where Θp is the angle formed between the axial principal ray and a line normal to the second reflecting surface in the decentration direction at a point where the axial principal ray intersects the second reflecting surface.

The reasons for adopting the above-described arrangements in the present invention, together with the functions thereof, will be described below.

In a refracting optical system using lenses, image formation is performed by rays repeatedly subjected to refraction at an interface surface and propagation to the subsequent interface surface. Accordingly, rays from an object basically pass through the lenses to reach an image plane. In a general coaxial optical system, therefore, it is very difficult to reduce the thickness in the direction of the optical axis. It is possible to somewhat reduce the thickness of such a coaxial optical system by increasing the power of each individual optical element and devising an effective power distribution for the entire optical system. However, this cannot be regarded as a drastic solution to the problems. In a refracting optical system, when rays are refracted at an interface surface of a lens, chromatic aberration occurs unavoidably according to chromatic dispersion characteristics of the lens. To correct the chromatic aberration, the refracting optical system needs to add another lens. Consequently, the number of constituent lens elements increases, and the cost rises unfavorably. In addition, the optical system becomes unfavorably large in size.

Meanwhile, a reflecting optical system using a mirror or a prism produces no chromatic aberration in theory even when a reflecting surface thereof is provided with a power, and need not add another optical element only for the purpose of correcting chromatic aberration. Accordingly, the reflecting optical system allows the number of constituent optical elements to be reduced from the viewpoint of chromatic aberration correction and is therefore capable of being formed in a compact structure at a reduced cost in comparison to the refracting optical system. In addition, because the reflecting optical system has a folded optical path, the thickness of the optical system itself can be reduced in comparison to the refracting optical system.

As the size of an image pickup device reduces, the actual focal length of the optical system becomes shorter even if the field angle is the same. However, it is preferable that the optical path length of the entire optical system should be longer than the focal length of the entire optical system from the viewpoint of restrictions on the physical size of the optical elements and the focal length. Therefore, it is desirable to arrange the entire optical system in the form of a retrofocus type having a negative front unit and a positive rear unit. This is also the most suitable for use in an optical system using an image pickup device having a geometric pixel array, e.g. a CCD. That is, the retrofocus type is the most suitable arrangement for placing an optical low-pass filter or an infrared cutoff filter between the optical system and the image pickup device to remove moire or to eliminate the influence of infrared rays.

Thus, the present invention is characterized by the retrofocus type optical system in which reflecting surfaces are provided with negative and positive powers. However, a satisfactorily thin optical system cannot be obtained simply by adopting such a retrofocus type arrangement. How to achieve a satisfactorily thin optical system will be described below in detail.

The optical path length needed for an optical system is basically the same regardless of whether the optical path is straight along the optical axis or folded. Accordingly, to achieve a thin optical system by using reflecting surfaces, it is conceivable to use a large number of reflecting surfaces M1, M2, M3, etc., as shown in FIG. 13, so as to lead rays in a direction approximately perpendicular to the direction in which the rays enter the optical system. In this case, although it is possible to achieve a reduction in thickness of the optical system, the large number of reflecting surfaces M1, M2, M3, etc., which have a high decentration error sensitivity in comparison to refracting surfaces, need to be machined and assembled with high accuracy, resulting in an increase in the cost.

According to the present invention, it is possible to minimize the number of reflecting surfaces used, which have a high decentration error sensitivity, by adopting the above-described arrangement and satisfying the above-described conditions. Therefore, it is possible to achieve a reduction in the cost as well as a reduction in thickness of the optical system.

That is, the present invention provides at least one reflecting surface satisfying the condition (1) between a reflecting surface of negative power and a reflecting surface of positive power to reflect the axial principal ray at an obtuse angle to the direction in which rays enter the optical system, instead of using a large number of reflecting surfaces, thereby achieving a reduction in thickness of the optical system. This arrangement also makes it possible to reduce the number of reflecting surfaces, which have a high decentration error sensitivity, in comparison to an arrangement in which the optical path length is the same as in the arrangement of the present invention, but the thickness of the optical system is reduced by using a reflecting surface by which the axial principal ray is reflected at an acute angle. Accordingly, it is possible to reduce the cost. If the angle |θ| is not larger than the lower limit of the condition (1), i.e. 45°, the axial principal ray is reflected at an acute angle undesirably. Consequently, it becomes impossible to achieve a reduction in thickness of the optical system with a reduced number of reflecting surfaces. To achieve a reduction in thickness without satisfying the condition (1), the number of reflecting surfaces must be increased. Consequently, the cost rises unfavorably.

Thus, the object of the present invention is attained. It should be noted that a conceptual view of the reflecting surface arrangement in the present invention is shown in FIG. 14. In FIG. 14: reference character Mn denotes a reflecting surface of negative power; Mp denotes a reflecting surface of positive power; and Ma and Mb denote reflecting surfaces placed between the two reflecting surfaces Mn and Mp.

It is more desirable to set an upper limit value for the condition (1) as in the following condition (1-1):

$$45° \leq |\theta| < 90° \tag{1-1}$$

If $|\theta|$ is not smaller than the upper limit of the condition (1-1), i.e. 90°, the reflecting surface loses its reflecting action.

It is even more desirable from the viewpoint of ensuring the required performance to satisfy the following condition:

$$45° \leq |\theta| < 70° \tag{1-2}$$

The reflecting surfaces used in the present invention can utilize front-surface reflection using a mirror, back-surface reflection using a prism, and so forth. In the case of the front-surface reflection using a mirror, no chromatic aberration occurs in theory. Therefore, there is no adverse effect on the performance of the optical system. In the case of the back-surface reflection using a prism, the degree of freedom for aberration correction is increased by giving a curvature to each of the entrance and exit surfaces, and thus even more favorable performance can be attained. In particular, when a prism is used as a reflecting surface, because the positional relationship between the surfaces of the prism is fixed, it is only necessary to effect decentration control for the prism as a single unit, and there is no need for high assembly accuracy and a large number of manhours for adjustment as are needed for ordinary reflecting surfaces, which have high sensitivity to decentration errors in comparison to refracting surfaces.

Therefore, if the reflecting surfaces having negative and positive powers, respectively, in the present invention are arranged to utilize back-surface reflection by a prism and assigned the greater part of the desired power to thereby reduce the powers of the entrance and exit surfaces, which are refracting surfaces, it is possible to reduce chromatic aberration to a very small quantity in comparison to refracting optical elements such as lenses while maintaining the degree of freedom for aberration correction at a high level in comparison to mirrors. Furthermore, the inside of a prism is filled with a transparent medium having a refractive index higher than that of air. Therefore, it is possible to obtain a longer optical path length than in the case of air. Accordingly, the use of a prism makes it possible to obtain an optical system that is thinner and more compact than those formed from lenses, mirrors and so forth, which are placed in the air.

Of the plurality of reflecting surfaces having power, which are used in the present invention, the reflecting surface of negative power that is the closest to the object side is arranged to satisfy the following condition (2). By doing so, it becomes possible to obtain a sufficiently long back focus as well as to reduce the thickness of the optical system and ensure the required performance.

$$|\Theta n| < 45° \tag{2}$$

where $\Theta n$ is the angle formed between the axial principal ray and a line normal to the above-described reflecting surface of negative power in the decentration direction at a point where the axial principal ray intersects the reflecting surface.

To achieve a reduction in thickness of an optical system by using reflecting surfaces as in the present invention, it is desirable that at least one of the reflecting surfaces should be decentered with respect to the axial principal ray. If the reflecting surfaces are not decentered at all, at least the axial principal ray is intercepted, so that no image is formed on the axis. However, if a reflecting surface provided with a power is decentered with respect to the axial principal ray, rotationally asymmetric decentration aberrations occur even on the axis. The rotationally asymmetric decentration aberrations cannot completely be corrected by a rotationally symmetric surface in theory. It is important to reduce the rotationally asymmetric decentration aberrations within certain tolerances. The amount of decentration aberrations depends on the magnitude of power, of course, but it also depends largely on the amount of displacement. Therefore, the amount of displacement must be reduced to a certain extent in order to obtain the desired power. The condition (2) is provided to reduce the amount of decentration aberrations within the tolerances while giving the desired power to the reflecting surface. If $|\Theta n|$ is not smaller than the upper limit of the condition (2), i.e. 45°, the amount of decentration aberrations produced by the surface becomes excessively large, and it is impossible to correct the decentration aberrations.

It is more desirable to set a lower limit for the condition (2) as in the following condition (2-1):

$$5° < |\Theta n| < 45° \tag{2-1}$$

If $|\Theta n|$ is not larger than the lower limit of the condition (2-1), i.e. 50°, the axial principal ray is intercepted by another reflecting surface. Consequently, no image is formed on the axis.

It is even more desirable to satisfy the following condition (2-2):

$$5° < |\Theta n| < 30° \tag{2-2}$$

By satisfying the condition (2-2), it is possible to achieve a reduction in thickness of the optical system and, at the same time, to correct the decentration aberrations even more favorably.

In addition, the reflecting surface of positive power, which is closer to the image side than the reflecting surface of negative power, is arranged to satisfy the following condition (3). By doing so, it becomes possible to achieve a reduction in thickness of the optical system and to ensure the required performance. It should be noted that the term "reflecting surface of positive power" as used herein means a reflecting surface that is placed closer to the image side than the above-described reflecting surface of negative power and that has the strongest positive power in the optical system according to the present invention.

$$|\Theta p| < 45° \tag{3}$$

where $\Theta p$ is the angle formed between the axial principal ray and a line normal to the reflecting surface of positive power in the decentration direction at a point where the axial principal ray intersects the reflecting surface.

The condition (3) is provided to reduce decentration aberrations within predetermined tolerances while giving the desired power to the reflecting surface. If $|\Theta p|$ is not smaller than the upper limit of the condition (3), i.e. 45°, the amount of decentration aberrations produced by the reflecting surface becomes excessively large, and it is impossible to correct the decentration aberrations.

It is more desirable to set a lower limit for the condition (3) as in the following condition (3-1):

$$5° < |\Theta p| < 45° \tag{3-1}$$

If $|\Theta p|$ is not larger than the lower limit of the condition (3-1), i.e. 5°, the axial principal ray is intercepted by another reflecting surface. Consequently, no image is formed on the axis.

It is even more desirable to satisfy the following condition (3-2):

$$5° < |\Theta p| < 40° \qquad (3\text{-}2)$$

By satisfying the condition (3-2), it is possible to achieve a reduction in thickness of the optical system and, at the same time, to correct the decentration aberrations even more favorably.

The above-described reflecting surface of negative power, which is used in the present invention, is preferably a reflecting surface having only a reflecting action. When the reflecting surface has only a reflecting action, it can be provided with the desired power, provided that decentration aberrations are within an allowable range. However, if the reflecting surface has both reflecting and transmitting actions, the amount of chromatic aberration produced by the transmitting action becomes excessively large, and it is impossible to correct the chromatic aberration.

The above-described reflecting surface of positive power, which is used in the present invention, is preferably a reflecting surface having only a reflecting action. When the reflecting surface has only a reflecting action, it can be provided with the desired power, provided that decentration aberrations are within an allowable range. However, if the reflecting surface has both reflecting and transmitting actions, the amount of chromatic aberration produced by the transmitting action becomes excessively large, and it is impossible to correct the chromatic aberration.

When a reflecting surface with a power is decentered with respect to the axial principal ray, it is desirable that at least one of the surfaces used in the present invention should be a rotationally asymmetric surface. It is particularly preferable from the viewpoint of aberration correction that at least one reflecting surface should be a rotationally asymmetric surface.

The reason for this will be described below in detail.

First, a coordinate system used in the following description and rotationally asymmetric surfaces will be described.

An optical axis defined by a straight line along which the axial principal ray travels until it intersects the first surface of the optical system is defined as a Z-axis. An axis perpendicularly intersecting the Z-axis in the decentration plane of each surface constituting the image-forming optical system is defined as a Y-axis. An axis perpendicularly intersecting the optical axis and also perpendicularly intersecting the Y-axis is defined as an X-axis. Ray tracing is forward ray tracing in which rays are traced from the object toward the image plane.

In general, a spherical lens system comprising only a spherical lens is arranged such that aberrations produced by spherical surfaces, such as spherical aberration, coma, and curvature of field, are corrected with some surfaces by canceling the aberrations with each other, thereby reducing aberrations as a whole.

On the other hand, rotationally symmetric aspherical surfaces and the like are used to correct aberrations favorably with a minimal number of surfaces. The reason for this is to reduce various aberrations that would be produced by spherical surfaces.

However, in a decentered optical system, rotationally asymmetric aberrations due to decentration cannot be corrected by a rotationally symmetric optical system. Rotationally asymmetric aberrations due to decentration include distortion, curvature of field, and astigmatic and comatic aberrations, which occur even on the axis.

First, rotationally asymmetric curvature of field will be described. For example, when rays from an infinitely distant object point are incident on a decentered concave mirror, the rays are reflected by the concave mirror to form an image. In this case, the back focal length from that portion of the concave mirror on which the rays strike to the image surface is a half the radius of curvature of the portion on which the rays strike in a case where the medium on the image side is air. Consequently, as shown in FIG. 21, an image surface tilted with respect to the axial principal ray is formed. It is impossible to correct such rotationally asymmetric curvature of field by a rotationally symmetric optical system.

To correct the tilted curvature of field by the concave mirror M itself, which is the source of the curvature of field, the concave mirror M is formed from a rotationally asymmetric surface, and, in this example, the concave mirror M is arranged such that the curvature is made strong (refracting power is increased) in the positive direction of the Y-axis, whereas the curvature is made weak (refracting power is reduced) in the negative direction of the Y-axis. By doing so, the tilted curvature of field can be corrected. It is also possible to obtain a flat image surface with a minimal number of constituent surfaces by placing a rotationally asymmetric surface having the same effect as that of the above-described arrangement in the optical system separately from the concave mirror M.

It is preferable that the rotationally asymmetric surface should be a rotationally asymmetric surface having no axis of rotational symmetry in the surface nor out of the surface. If the rotationally asymmetric surface has no axis of rotational symmetry in the surface nor out of the surface, the degree of freedom increases, and this is favorable for aberration correction.

Next, rotationally asymmetric astigmatism will be described.

A decentered concave mirror M produces astigmatism even for axial rays, as shown in FIG. 22, as in the case of the above. The astigmatism can be corrected by appropriately changing the curvatures in the X- and Y-axis directions of the rotationally asymmetric surface as in the case of the above.

Rotationally asymmetric coma will be described below.

A decentered concave mirror M produces coma even for axial rays, as shown in FIG. 23, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

The image-forming optical system according to the present invention may also be arranged such that the above-described at least one surface having a reflecting action is decentered with respect to the axial principal ray and has a rotationally asymmetric surface configuration and further has a power. By adopting such an arrangement, decentration aberrations produced as the result of giving a power to the reflecting surface can be corrected by the surface itself. In addition, the power of the refracting surfaces of the prism is reduced, and thus chromatic aberration produced in the prism can be minimized.

The rotationally asymmetric surface used in the present invention should preferably be a plane-symmetry free-form surface having only one plane of symmetry. Free-form surfaces used in the present invention are defined by the following equation (a). It should be noted that the Z-axis of the defining equation is the axis of the free-form surface.

$$Z = cr^2 / \left[1 + \sqrt{\{1-(1+k)c^2r^2\}}\right] + \sum_{j=2}^{66} C_j X^m Y^n \quad (a)$$

In Eq. (a), the first term is a spherical surface term, and the second term is a free-form surface term.

In the spherical surface term:
c: the curvature at the vertex
k: a conic constant
$r=\sqrt{(X^2+Y^2)}$
The free-form surface term is given by $$\sum_{j=2}^{66} C_j X^m Y^n$$

$=C_2X+C_3Y$
$+C_4X^2+C_5XY+C_6Y^2$
$+C_7X^3+C_8X^2Y+C_9XY^2+C_{10}Y^3$
$+C_{11}X^4+C_{12}X^3Y+C_{13}X^2Y^2+C_{14}XY^3+C_{15}Y^4$
$+C_{16}X^5+C_{17}X^4Y+C_{18}X^3Y^2+C_{19}X^2Y^3+C_{20}XY^4$
$\quad +C_{21}Y^5$
$+C_{22}X^6+C_{23}X^5Y+C_{24}X^4Y^2+C_{25}X^3Y^3+C_{26}X^2Y^4$
$\quad +C_{27}XY^5+C_{28}Y^6$
$+C_{29}X^7+C_{30}X^6Y+C_{31}X^5Y^2+C_{32}X^4Y^3+C_{33}X^3Y^4$
$\quad +C_{34}X^2Y^5+C_{35}XY^6+C_{36}Y^7$ where $C_j$ (j is an integer of 2 or higher) are coefficients.

In general, the above-described free-form surface does not have planes of symmetry in both the XZ- and YZ-planes. In the present invention, however, a free-form surface having only one plane of symmetry parallel to the YZ-plane is obtained by making all terms with odd-numbered powers of X zero. For example, in the above defining equation (a), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . are set equal to zero. By doing so, it is possible to obtain a free-form surface having only one plane of symmetry parallel to the YZ-plane.

A free-form surface having only one plane of symmetry parallel to the XZ-plane is obtained by making all terms with odd-numbered powers of Y zero. For example, in the above defining equation (a), the coefficients of the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the optical system is determined to be the X-axis direction. By doing so, rotationally asymmetric aberrations due to decentration can be corrected effectively, and at the same time, the productivity can be improved.

It should be noted that the above defining equation (a) is shown as merely an example, and that the feature of the present invention resides in that rotationally asymmetric aberrations due to decentration are corrected and, at the same time, the productivity is improved by using a rotationally asymmetric surface having only one plane of symmetry. Therefore, the same advantageous effect can be obtained for any other defining equation that expresses such a rotationally asymmetric surface.

When prisms are used in the optical system according to the present invention, at least one surface of at least one prism should preferably be an optical surface having both transmitting and reflecting actions. In reflecting optical elements using reflecting surfaces, which has a high decentration error sensitivity, decentration errors of each surface are transferred to the subsequent surface, and eventually the decentration errors of all the surfaces are added up undesirably. In the case of a prism in particular, among reflecting optical elements, decentration errors are determined when the prism is molded and cannot be corrected during assembly or adjustment. Therefore, from the viewpoint of minimizing the added decentration errors, the smaller the number of reflecting surfaces, the better. Furthermore, the shorter the optical path length in the prism, the smaller the decentration errors transferred. As a result, the manufacturing accuracy required for the reflecting surfaces is eased.

Accordingly, at least one prism uses at least one optical surface having both reflecting and transmitting actions, thereby making it possible to use a limited space effectively and to attain a reduction in size of the prism itself. At the same time, the optical path length can be shortened. Therefore, it is possible to minimize decentration errors. Thus, the cost is reduced.

The reflecting action of the optical surface having both transmitting and reflecting actions in the present invention should desirably be total reflection. If the condition for total reflection is not satisfied, the optical surface cannot have both reflecting and transmitting actions, and it becomes difficult to reduce the size of the prism.

Reflecting surfaces used in the present invention, exclusive of totally reflecting surfaces, are preferably formed from a reflecting surface having a thin film of a metal, e.g. aluminum or silver, formed on the surface thereof, or a reflecting surface formed from a dielectric multilayer film. In the case of a metal thin film having reflecting action, a high reflectivity can be readily obtained. The use of a dielectric reflecting film is advantageous in a case where a reflecting film having wavelength selectivity or minimal absorption is to be formed.

In the present invention, focusing of the image-forming optical system can be effected by moving all the constituent elements or moving only one prism. However, it is also possible to effect focusing by moving the image-formation plane in the direction of the axial principal ray exiting from the surface closest to the image side. By doing so, it is possible to prevent displacement of the axial principal ray on the entrance side due to focusing even if the direction in which the axial principal ray from the object enters the optical system is not coincident with the direction of the axial principal ray exiting from the surface closest to the image side owing to the decentration of the image-forming optical system. It is also possible to effect focusing by using a focusing prism 6 as shown in FIG. 11. The focusing prism 6 has a plurality of wedge-shaped prisms P1 and P2 formed by dividing a plane-parallel plate. Focusing is effected by moving the wedge-shaped prisms P1 and P2 in a direction perpendicular to the Z-axis (optical axis). In this case also, focusing can be performed independently of the decentration of the image-forming optical system.

In the present invention, if at least one prism is formed by using a resin material such as a plastic material, the cost can be reduced. It is desirable to use a material of low moisture absorption, such as amorphous polyolefin, because such a material has a minimum change in image-forming performance with changes in moisture.

Furthermore, as shown in FIG. 12, the optical path can be folded in a direction different from the decentration direction of the image-forming optical system according to the present invention by placing a reflecting member 7, e.g. a mirror, on the object side of the entrance surface of the image-forming optical system. By doing so, the degree of freedom for layout of the image-forming optical system further increases, and the overall size of the image-forming optical apparatus can be further reduced.

In the present invention, the image-forming optical system can be formed from prisms alone. By doing so, the number of components can be reduced, and thus the cost is reduced. It is also possible to integrate a plurality of prisms into one prism with a stop put therebetween. By doing so, the cost can be further reduced.

In the present invention, the refracting and reflecting surfaces of the image-forming optical system may be formed from spherical surfaces or rotationally symmetric aspherical surfaces.

It should be noted that the stop in the present invention may be either a variable stop in which an aperture portion that passes a light beam is variable or an aperture stop whose aperture is fixed. It is desirable that the stop should be placed at or near the position of a pupil that is determined by the optical system.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 5 of the image-forming optical system according to the present invention will be described below. It should be noted that constituent parameters of each example will be shown later.

Figure 1:
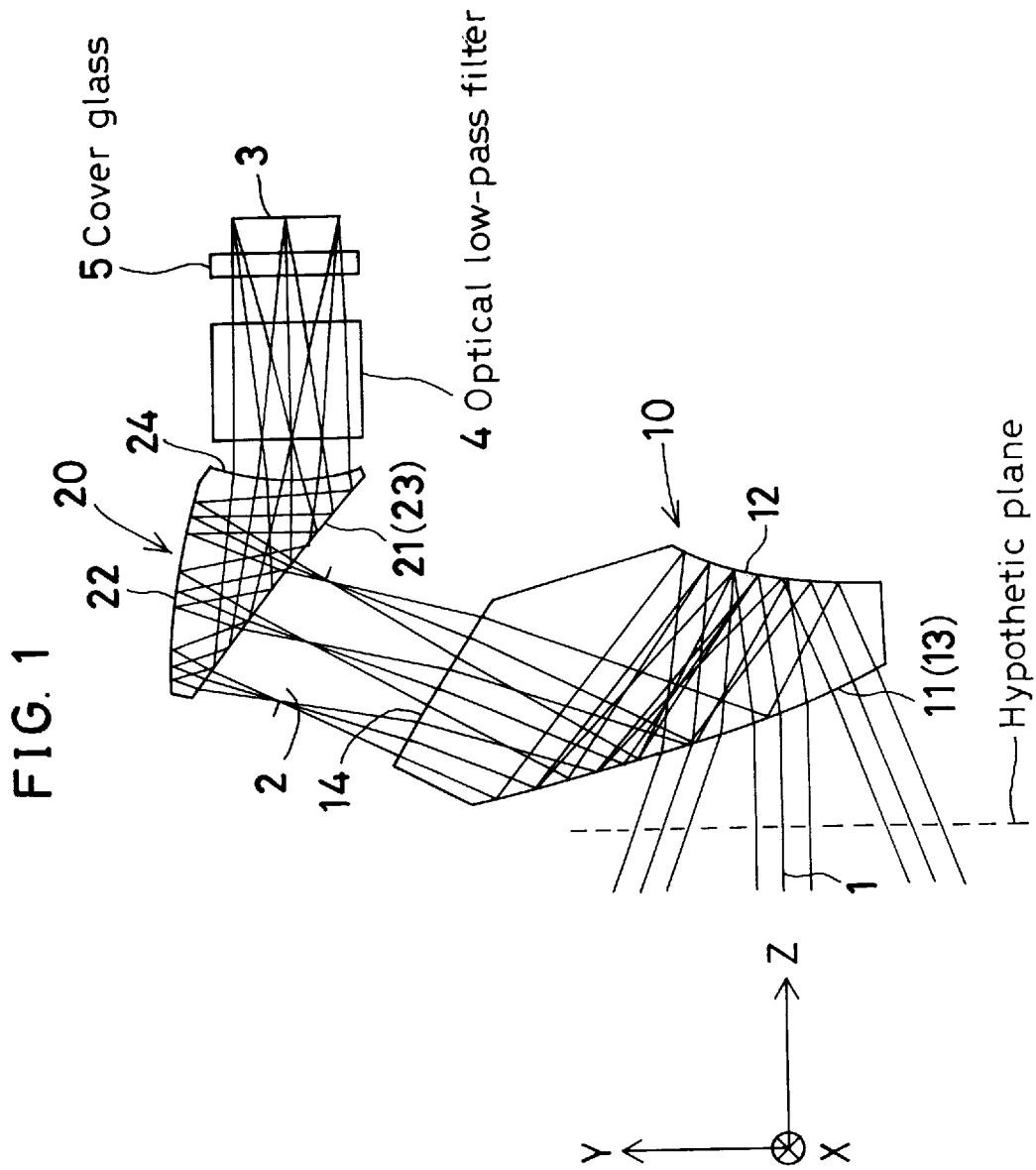
FIG. 1 is a sectional view of an image-forming optical system according to Example 1 of the present invention.

In each example, as shown in FIG. 1, the center of a specific surface of the optical system (in Example 1 of FIG. 1, each of the hypothetic plane of surface No. 1 and the stop plane of surface No. 6; the same is the case with Examples 2 to 4; in Example 5, each of the hypothetic plane of surface No. 1 and the stop plane of surface No. 8) is defined as the origin of a decentered optical system, and an axial principal ray 1 is defined by a ray emanating from the center of an object and passing through the center of a stop 2. A Z-axis is taken in the direction in which the axial principal ray 1 travels from the object center to the first surface of the optical system. A plane containing the Z-axis and the center of the image plane is defined as a YZ-plane. A Y-axis is taken in a direction in the YZ-plane that perpendicularly intersects the Z-axis in a plane in which rays are folded by the surfaces of the optical system. The direction in which the Z-axis extends from the object point toward the first surface of the optical system is defined as a positive direction of the Z-axis. The upward direction as viewed in FIG. 1 is defined as a positive direction of the Y-axis. An axis that constitutes a right-handed orthogonal coordinate system in combination with the Y- and Z-axes is defined as an X-axis.

In Examples 1 to 5, decentration of each surface is made in the YZ-plane, and the one and only plane of symmetry of each rotationally asymmetric free-form surface is the YZ-plane.

Regarding decentered surfaces, each surface is given displacements in the X-, Y- and Z-axis directions (X, Y and Z, respectively) of the vertex position of the surface from the origin of the optical system, and tilt angles (degrees) of the center axis of the surface [the Z-axis of the above equation (a) in regard to free-form surfaces; the Z-axis of the following equation (b) in the case of aspherical surfaces] with respect to the X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis.

Among optical surfaces constituting the optical system in each example, a specific surface and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

Aspherical surfaces used in the present invention are rotationally symmetric aspherical surfaces given by the following equation:

$$Z=(y^2/R)/[1+\{1-(1+K)y^2/R^2\}^{1/2}]+Ay^4+By^6+Cy^8+Dy^{10}+ \quad (b)$$

In the above equation, Z is an optical axis (axial principal ray) for which the direction of travel of light is defined as a positive direction, and y is taken in a direction perpendicular to the optical axis. R is a paraxial curvature radius, K is a conic constant, and A, B, C, D . . . are 4th-, 6th-, 8th- and 10th-order aspherical coefficients, respectively. The Z-axis of this defining equation is the axis of the rotationally symmetric aspherical surface.

In the constituent parameters (shown later), those terms concerning free-form surfaces and aspherical surfaces for which no data is shown are zero. The refractive index is expressed by the refractive index for the spectral d-line (wavelength: 587.56 nanometers). Lengths are given in millimeters.

Free-form surfaces may also be defined by Zernike polynomials. That is, the configuration of a free-form surface may be defined by the following equation (c). The Z-axis of the defining equation (c) is the axis of Zernike polynomial. A rotationally asymmetric surface is defined by polar coordinates of the height of the Z-axis with respect to the XY-plane. In the equation (c), A is the distance from the Z-axis in the XY-plane, and R is the azimuth angle about the Z-axis, which is expressed by the angle of rotation measured from the Z-axis.

$$x = R \times \cos(A) \quad (c)$$
$$y = R \times \sin(A)$$
$$Z = D_2 + D_3 R\cos(A) + D_4 R\sin(A) + D_5 R^2\cos(2A) + D_6(R^2 - 1) +$$
$$D_7 R^2 \sin(2A) + D_8 R^3 \cos(3A) + D_9(3R^3 - 2R)\cos(A) +$$
$$D_{10}(3R^3 - 2R)\sin(A) + D_{11} R^3 \sin(3A) + D_{12} R^4 \cos(4A) +$$
$$D_{13}(4R^4 - 3R^2)\cos(2A) + D_{14}(6R^4 - 6R^2 + 1) +$$
$$D_{15}(4R^4 - 3R^2)\sin(2A) + D_{16} R^4 \sin(4A) + D_{17} R^5 \cos(5A) +$$
$$D_{18}(5R^5 - 4R^3)\cos(3A) + D_{19}(10R^5 - 12R^3 + 3R)\cos(A) +$$
$$D_{20}(10R^5 - 12R^3 + 3R)\sin(A) + D_{21}(5R^5 - 4R^3)\sin(3A) +$$
$$D_{22} R^5 \sin(5A) + D_{23} R^6 \cos(6A) + D_{24}(6R^6 - 5R^4)\cos(4A) +$$

-continued
$$D_{25}(15R^6 - 20R^4 + 6R^2)\cos(2A) +$$
$$D_{26}(20R^6 - 30R^4 + 12R^2 - 1) + D_{27}(15R^6 - 20R^4 + 6R^2)\sin(2A) +$$
$$D_{28}(6R^6 - 5R^4)\sin(4A) + D_{29} R^6 \sin(6A)$$

In the above equation, to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

Other examples of surfaces usable in the present invention are expressed by the following defining equation (d):

$$Z = \Sigma\Sigma C_{nm}XY$$

Assuming that k=7 (polynomial of degree 7), for example, a free-form surface is expressed by an expanded form of the above equation as follows:

$$Z = C_2 + C_3 y + C_4|x| + C_5 y^2 + C_6 y|x| + C_7 x^2 + C_8 y^3 + C_9 y^2|x| + \quad (d)$$
$$C_{10} yx^2 + C_{11}|x^3| + C_{12} y^4 + C_{13} y^3|x| + C_{14} y^2 x^2 + C_{15} y|x^3| +$$
$$C_{16} x^4 + C_{17} y^5 + C_{18} y^4|x| + C_{19} y^3 x^2 + C_{20} y^2|x^3| + C_{21} yx^4 +$$
$$C_{22}|x^5| + C_{23} y^6 + C_{24} y^5|x| + C_{25} y^4 x^2 + C_{26} y^3|x^3| +$$
$$C_{27} y^2 x^4 + C_{28} y|x^5| + C_{29} x^6 + C_{30} y^7 + C_{31} y^6|x| + C_{32} y^5 x^2 +$$
$$C_{33} y^4|x^3| + C_{34} y^3 x^4 + C_{35} y^2|x^5| + C_{36} yx^6 + C_{37}|x^7|$$

Although in the examples of the present invention the surface configuration is expressed by a free-form surface using the above equation (a), it should be noted that the same advantageous effect can be obtained by using the above equation (c) or (d).

In Examples 1 to 5, it is assumed that an image pickup device of 1/3 inch size in which the image size is about 2.5×1.8 millimeters is used. It should be noted that the present invention is also applicable to image pickup devices of other sizes. The present invention includes not only an image pickup optical system using the image-forming optical system according to the present invention but also an image pickup apparatus incorporating the optical system.

FIG. 1 is a sectional view of Example 1 taken along the YZ-plane containing the axial principal ray 1. In Example 1, the horizontal half field angle is 26.1 degrees, and the vertical half field angle is 20.2 degrees. The entrance pupil diameter is 1.78 millimeters. The image pickup device size is 2.45×1.84 millimeters. The focal length is equivalent to 5 millimeters in terms of the focal length of a rotationally symmetric optical system.

As shown in FIG. 1, Example 1 has, in order in which light passes from the object side, a first prism 10, a stop 2, a second prism 20, an optical low-pass filter 4, a cover glass 5 for protecting the imager surface, and an image plane 3 (imager light-receiving surface). The first prism 10 has a first transmitting surface 11 of positive power, a first reflecting surface 12 of negative power, a second reflecting surface 13, and a second transmitting surface 14. The second prism 20 has a first transmitting surface 21, a first reflecting surface 22 of positive power, a second reflecting surface 23, and a second transmitting surface 24 of negative power. The first transmitting surface 11 and second reflecting surface 13 of the first prism 10 are the identical optical surface having both transmitting and reflecting actions, and the first transmitting surface 21 and second reflecting surface 23 of the second prism 20 are the identical optical surface having both transmitting and reflecting actions. In the constituent parameters (shown later), the displacements of each of the surface Nos. 2 to 6 are expressed by the amounts of displacement from the decentration reference plane 1, and the displacements of each of the surface Nos. 7 to 11 are expressed by the amounts of displacement from the decentration reference plane 2. The image plane 3 is approximately perpendicular to the Z-axis.

In this example, incident rays traveling in the Z-axis direction are bent in the Y-axis direction by the first prism 10 and further bent in the Z-axis direction by the second prism 20. Thus, it is possible to make the image-forming optical system compact in size in both the Z- and Y-axis directions.

Figure 2:
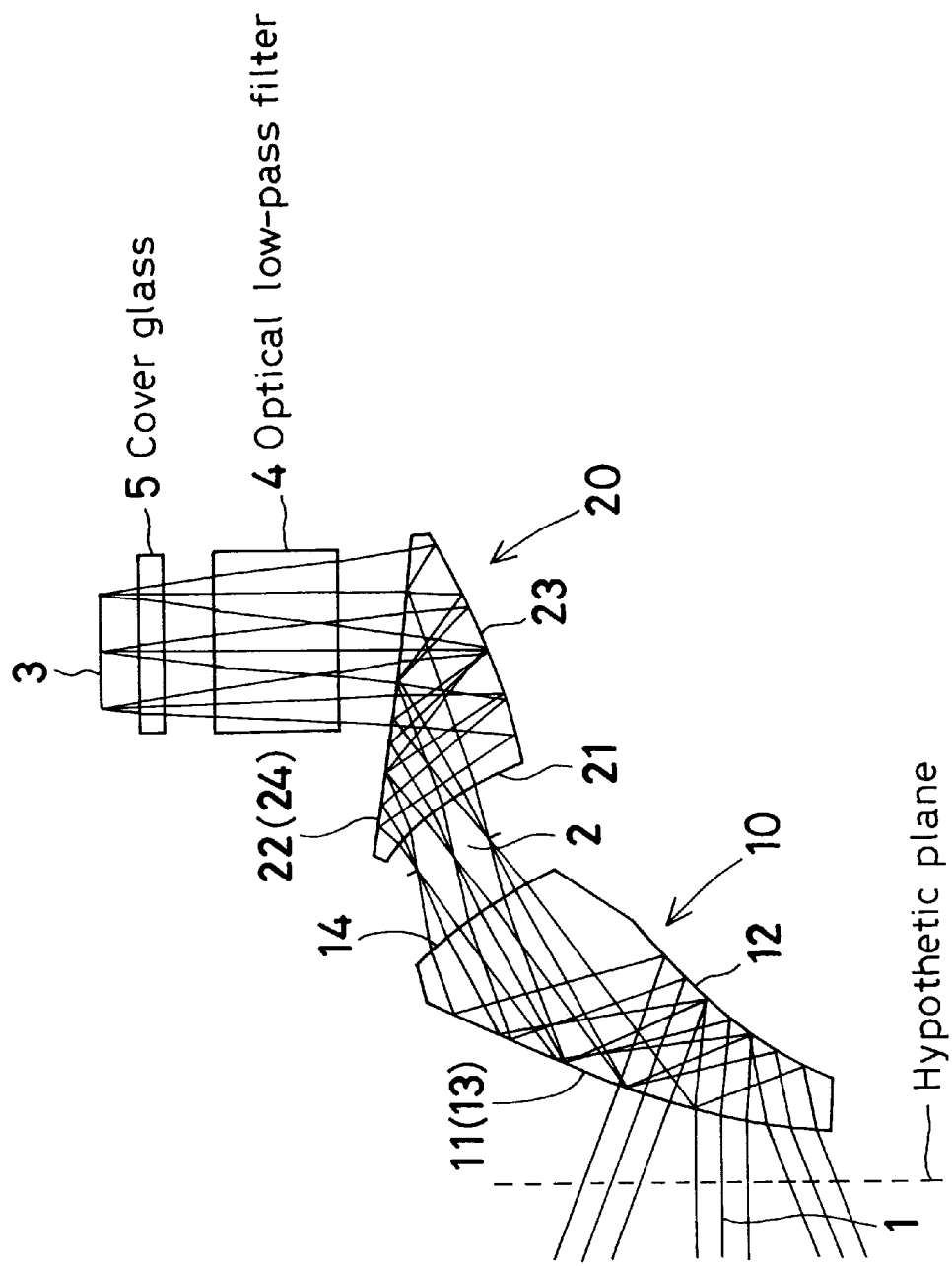
FIG. 2 is a sectional view of an image-forming optical system according to Example 2 of the present invention.

FIG. 2 is a sectional view of Example 2 taken along the YZ-plane containing the axial principal ray 1. In Example 2, the horizontal half field angle is 26.1 degrees, and the vertical half field angle is 20.2 degrees. The entrance pupil diameter is 1.78 millimeters. The image pickup device size is 2.45×1.84 millimeters. The focal length is equivalent to 5 millimeters in terms of the focal length of a rotationally symmetric optical system.

As shown in FIG. 2, Example 2 has, in order in which light passes from the object side, a first prism 10, a stop 2, a second prism 20, an optical low-pass filter 4, a cover glass 5 for protecting the imager surface, and an image plane 3 (imager light-receiving surface). The first prism 10 has a first transmitting surface 11 of positive power, a first reflecting surface 12 of negative power, a second reflecting surface 13 of positive power, and a second transmitting surface 14 of positive power. The second prism 20 has a first transmitting surface 21 of negative power, a first reflecting surface 22 of negative power, a second reflecting surface 23 of positive power, and a second transmitting surface 24 of negative power. The first transmitting surface 11 and second reflecting surface 13 of the first prism 10 are the identical optical surface having both transmitting and reflecting actions, and the first reflecting surface 22 and second transmitting surface 24 of the second prism 20 are the identical optical surface having both transmitting and reflecting actions. In the constituent parameters (shown later), the displacements of each of the surface Nos. 2 to 6 are expressed by the amounts of displacement from the decentration reference plane 1, and the displacements of each of the surface Nos. 7 to 11 are expressed by the amounts of displacement from the decentration reference plane 2. The image plane 3 is approximately perpendicular to the Y-axis.

In this example, incident rays traveling in the Z-axis direction are bent in the Y-axis direction and then bent in the Z-axis direction by the first prism 10. The rays are further bent in the Y-axis direction by the second prism 20. Thus, it is possible to make the image-forming optical system compact in size in both the Z- and Y-axis directions.

Figure 3:
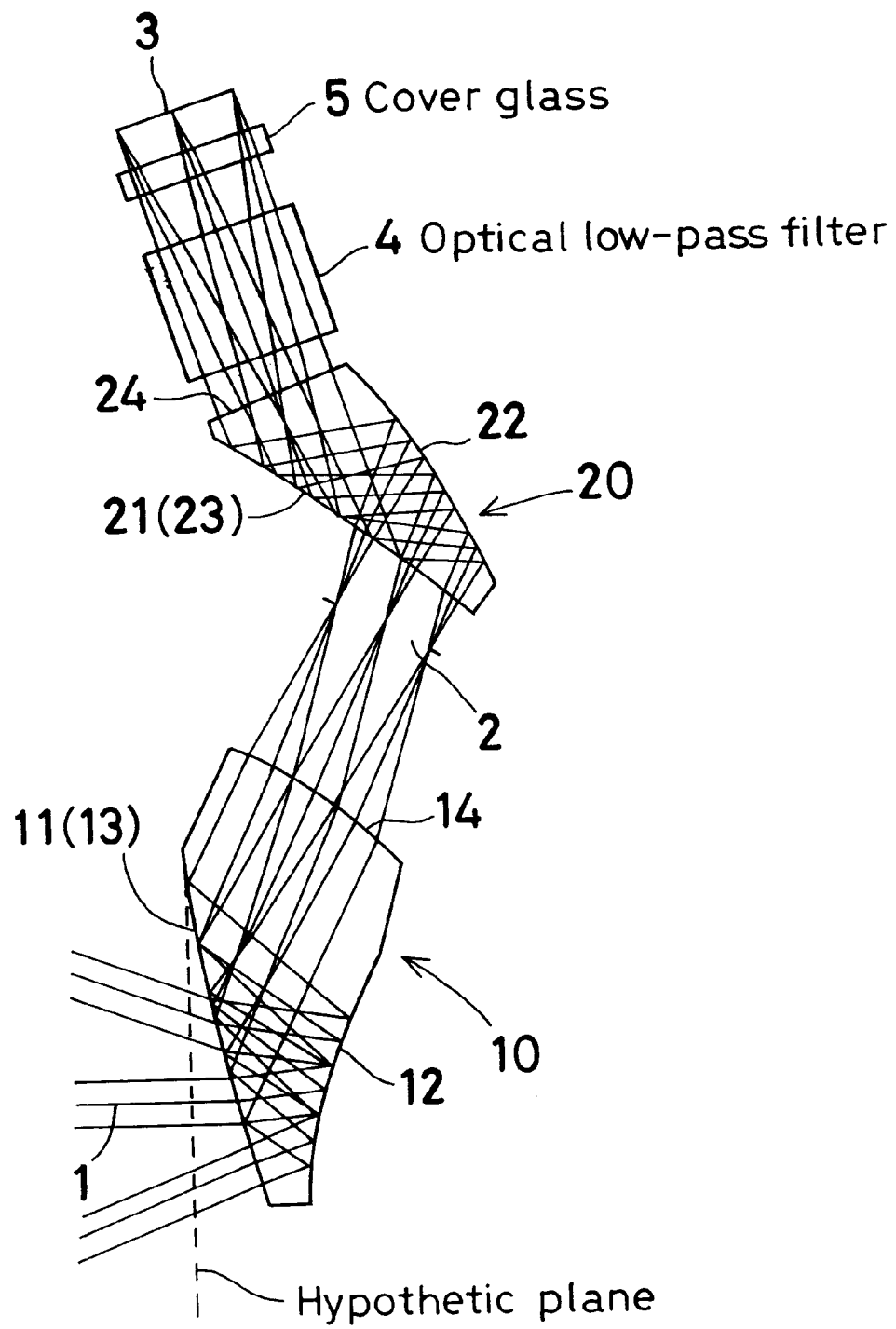
FIG. 3 is a sectional view of an image-forming optical system according to Example 3 of the present invention.

FIG. 3 is a sectional view of Example 3 taken along the YZ-plane containing the axial principal ray 1. In Example 3, the horizontal half field angle is 26.1 degrees, and the vertical half field angle is 20.2 degrees. The entrance pupil diameter is 1.78 millimeters. The image pickup device size is 2.45×1.84 millimeters. The focal length is equivalent to 5 millimeters in terms of the focal length of a rotationally symmetric optical system.

As shown in FIG. 3, Example 3 has, in order in which light passes from the object side, a first prism 10, a stop 2, a second prism 20, an optical low-pass filter 4, a cover glass 5 for protecting the imager surface, and an image plane 3 (imager light-receiving surface). The first prism 10 has a first transmitting surface 11 of positive power, a first reflecting surface 12 of negative power, a second reflecting surface 13 of positive power, and a second transmitting surface 14 of positive power. The second prism 20 has a first transmitting surface 21, a first reflecting surface 22 of positive power, a second reflecting surface 23, and a second transmitting surface 24. The first transmitting surface 11 and second reflecting surface 13 of the first prism 10 are the identical optical surface having both transmitting and reflecting actions, and the first transmitting surface 21 and second reflecting surface 23 of the second prism 20 are the identical optical surface having both transmitting and reflecting actions. In the constituent parameters (shown later), the displacements of each of the surface Nos. 2 to 6 are expressed by the amounts of displacement from the decentration reference plane 1, and the displacements of each of the surface Nos. 7 to 11 are expressed by the amounts of displacement from the decentration reference plane 2.

In this example, two prisms are placed in series in the Y-axis direction, thereby reducing the thickness in the Z-axis direction in particular. The axial principal ray exiting from the final surface of the image-forming optical system also travels in the Y-axis direction.

Figure 4:
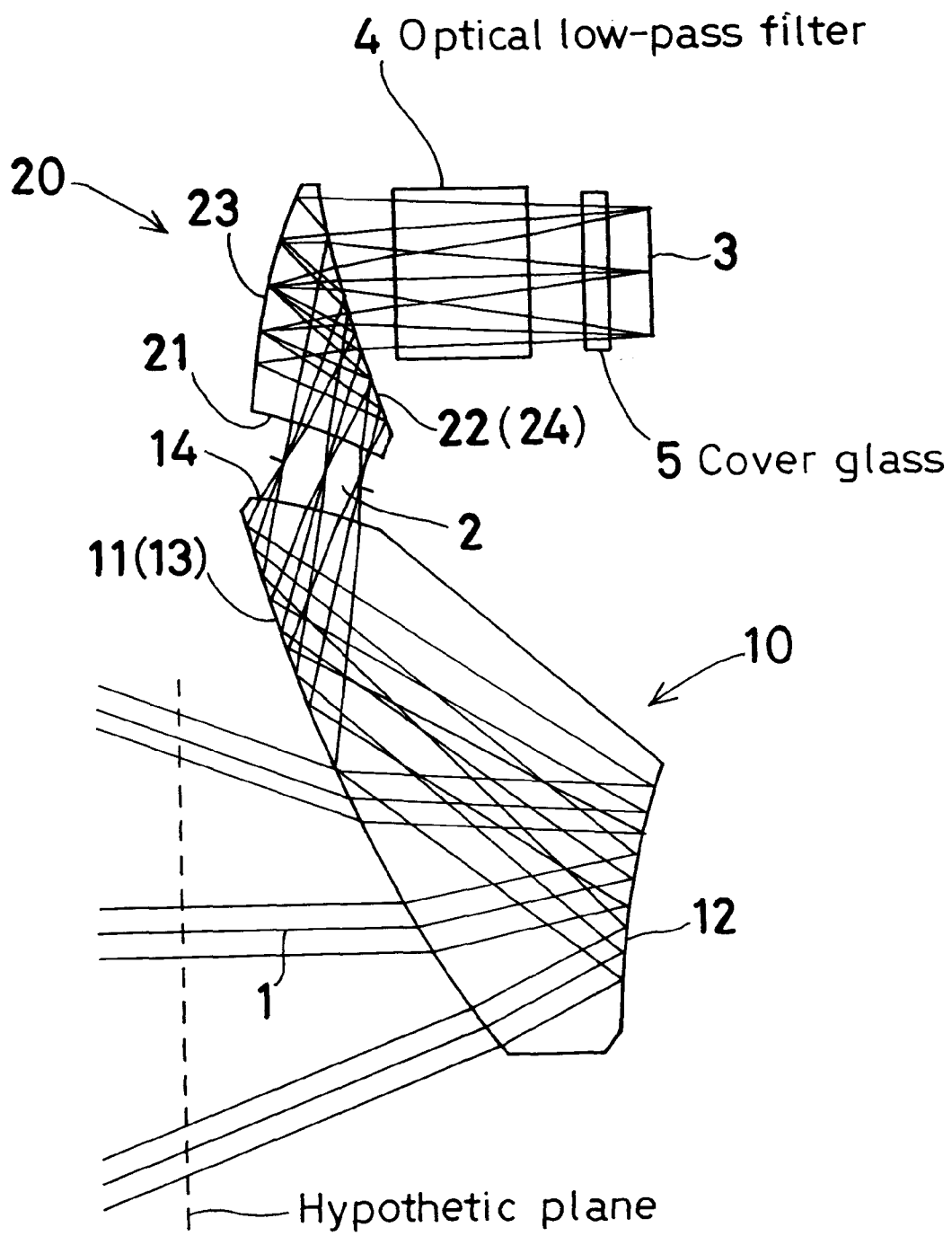
FIG. 4 is a sectional view of an image-forming optical system according to Example 4 of the present invention.

FIG. 4 is a sectional view of Example 4 taken along the YZ-plane containing the axial principal ray 1. In Example 4, the horizontal half field angle is 26.1 degrees, and the vertical half field angle is 20.2 degrees. The entrance pupil diameter is 1.78 millimeters. The image pickup device size is 2.45×1.84 millimeters. The focal length is equivalent to 5 millimeters in terms of the focal length of a rotationally symmetric optical system.

As shown in FIG. 4, Example 4 has, in order in which light passes from the object side, a first prism 10, a stop 2, a second prism 20, an optical low-pass filter 4, a cover glass 5 for protecting the imager surface, and an image plane 3 (imager light-receiving surface). The first prism 10 has a first transmitting surface 11 of positive power, a first reflecting surface 12 of negative power, a second reflecting surface 13 of positive power, and a second transmitting surface 14 of positive power. The second prism 20 has a first transmitting surface 21 of negative power, a first reflecting surface 22 of negative power, a second reflecting surface 23 of positive power, and a second transmitting surface 24 of negative power. The first transmitting surface 11 and second reflecting surface 13 of the first prism 10 are the identical optical surface having both transmitting and reflecting actions, and the first reflecting surface 22 and second transmitting surface 24 of the second prism 20 are the identical optical surface having both transmitting and reflecting actions. In the constituent parameters (shown later), the displacements of each of the surface Nos. 2 to 6 are expressed by the amounts of displacement from the decentration reference plane 1, and the displacements of each of the surface Nos. 7 to 11 are expressed by the amounts of displacement from the decentration reference plane 2. The image plane 3 is perpendicular to the Z-axis.

In this example, two prisms are placed in series in the Y-axis direction, thereby reducing the thickness in the Z-axis direction in particular.

Figure 5:
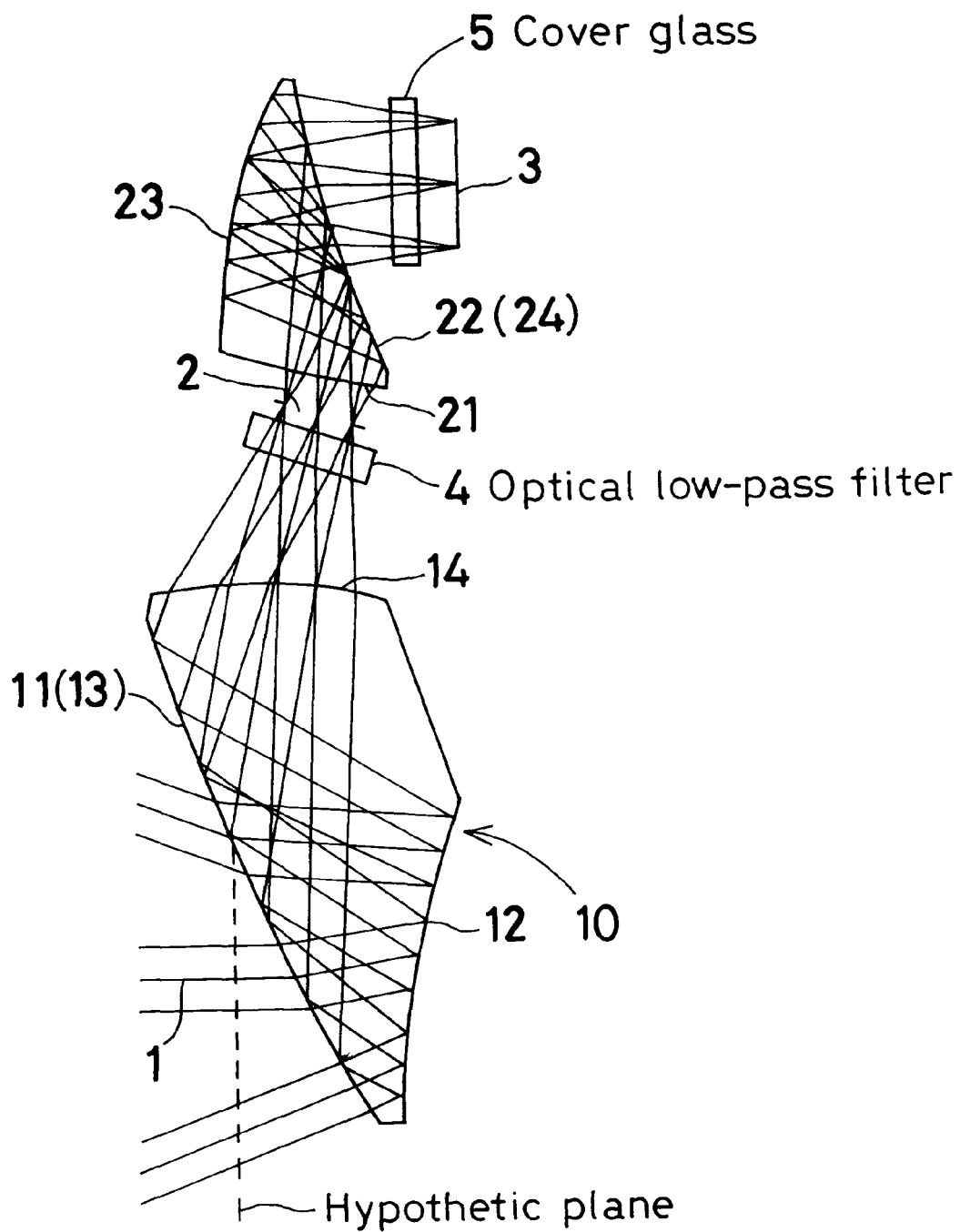
FIG. 5 is a sectional view of an image-forming optical system according to Example 5 of the present invention.
Figure 6:
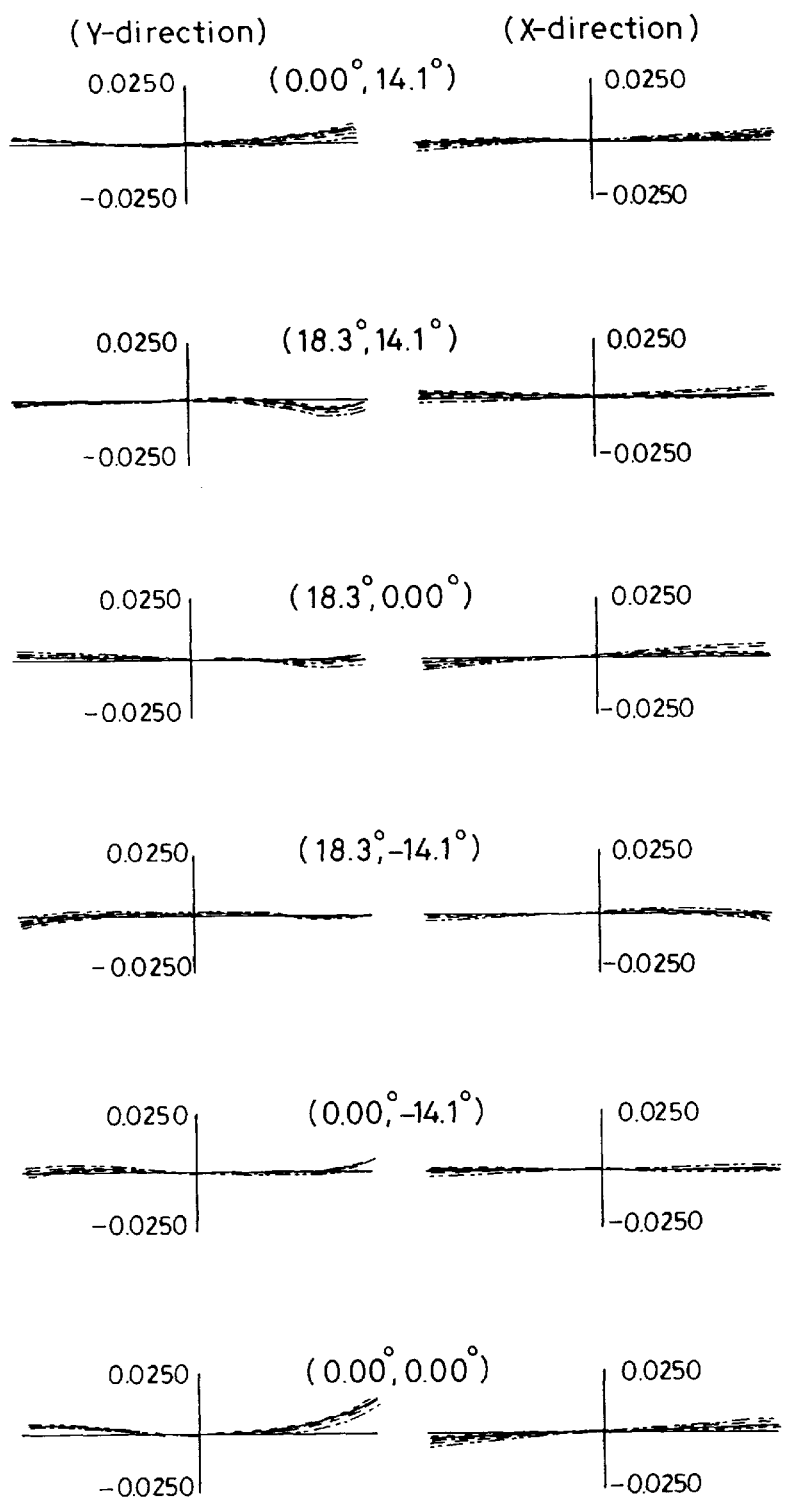
FIG. 6 is an aberrational diagram illustrating lateral aberrations in the image-forming optical system according to Example 1.
Figure 7:
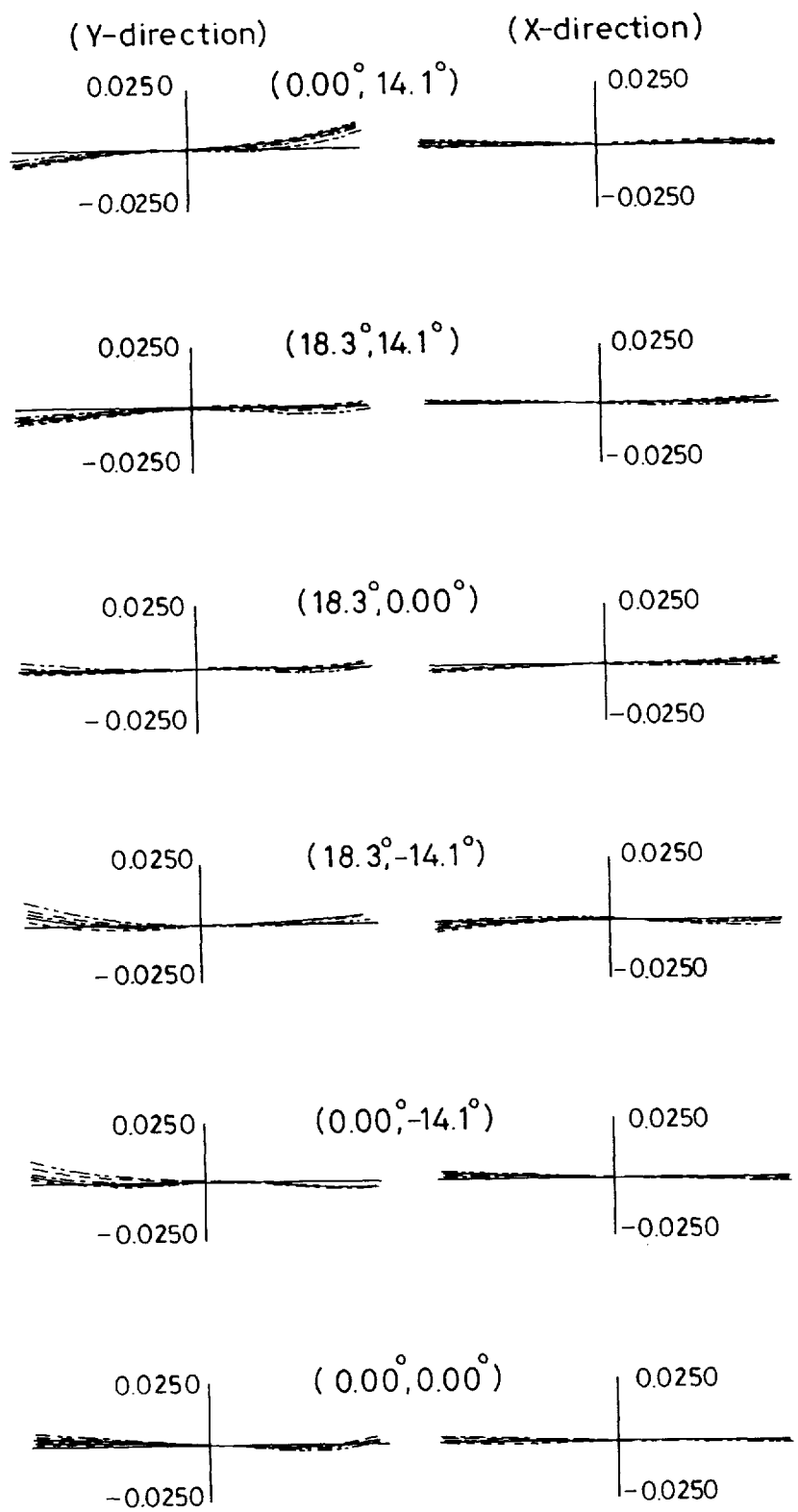
FIG. 7 is an aberrational diagram illustrating lateral aberrations in the image-forming optical system according to Example 2.
Figure 8:
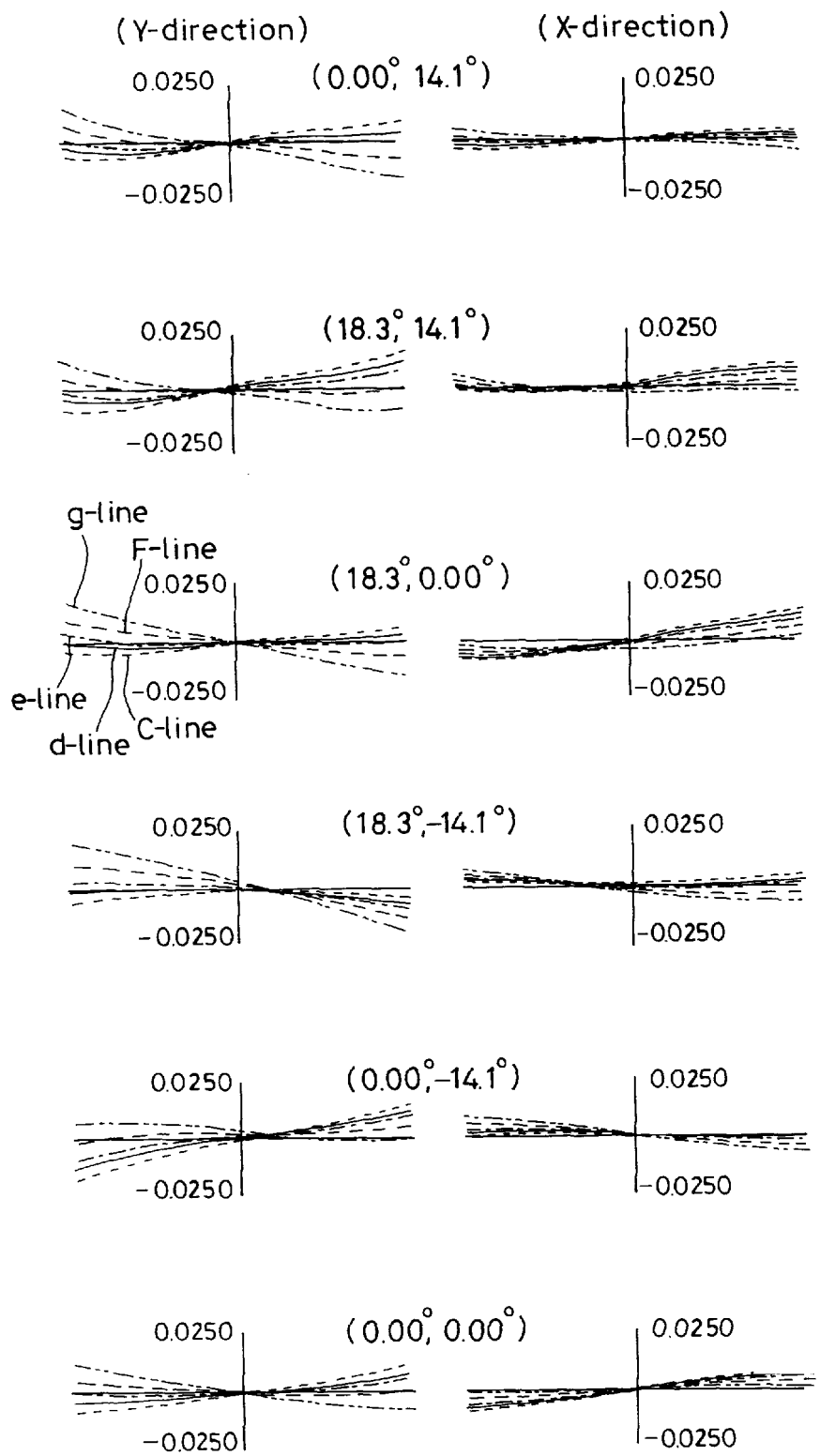
FIG. 8 is an aberrational diagram illustrating lateral aberrations in the image-forming optical system according to Example 3.
Figure 9:
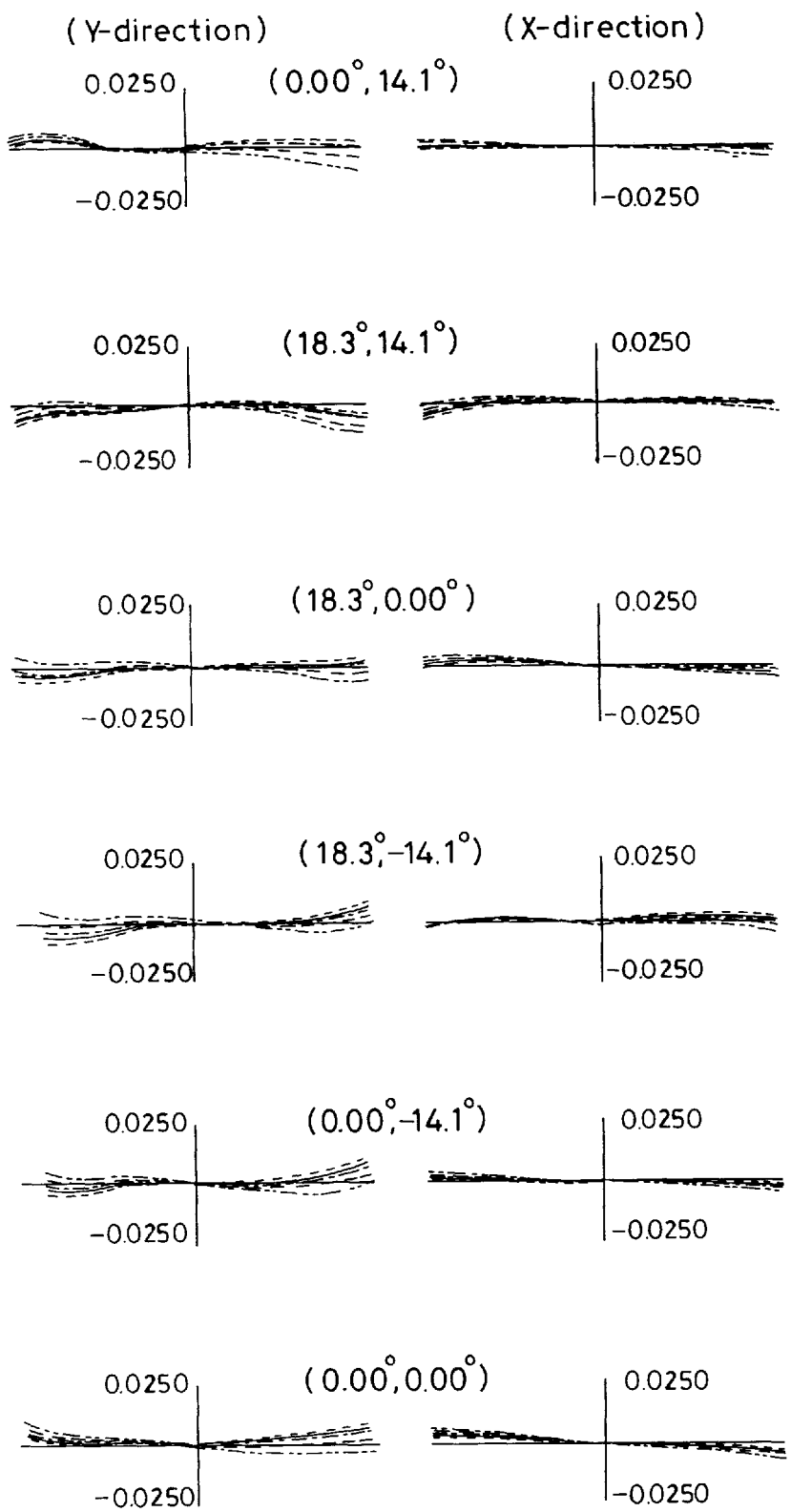
FIG. 9 is an aberrational diagram illustrating lateral aberrations in the image-forming optical system according to Example 4.
Figure 10:
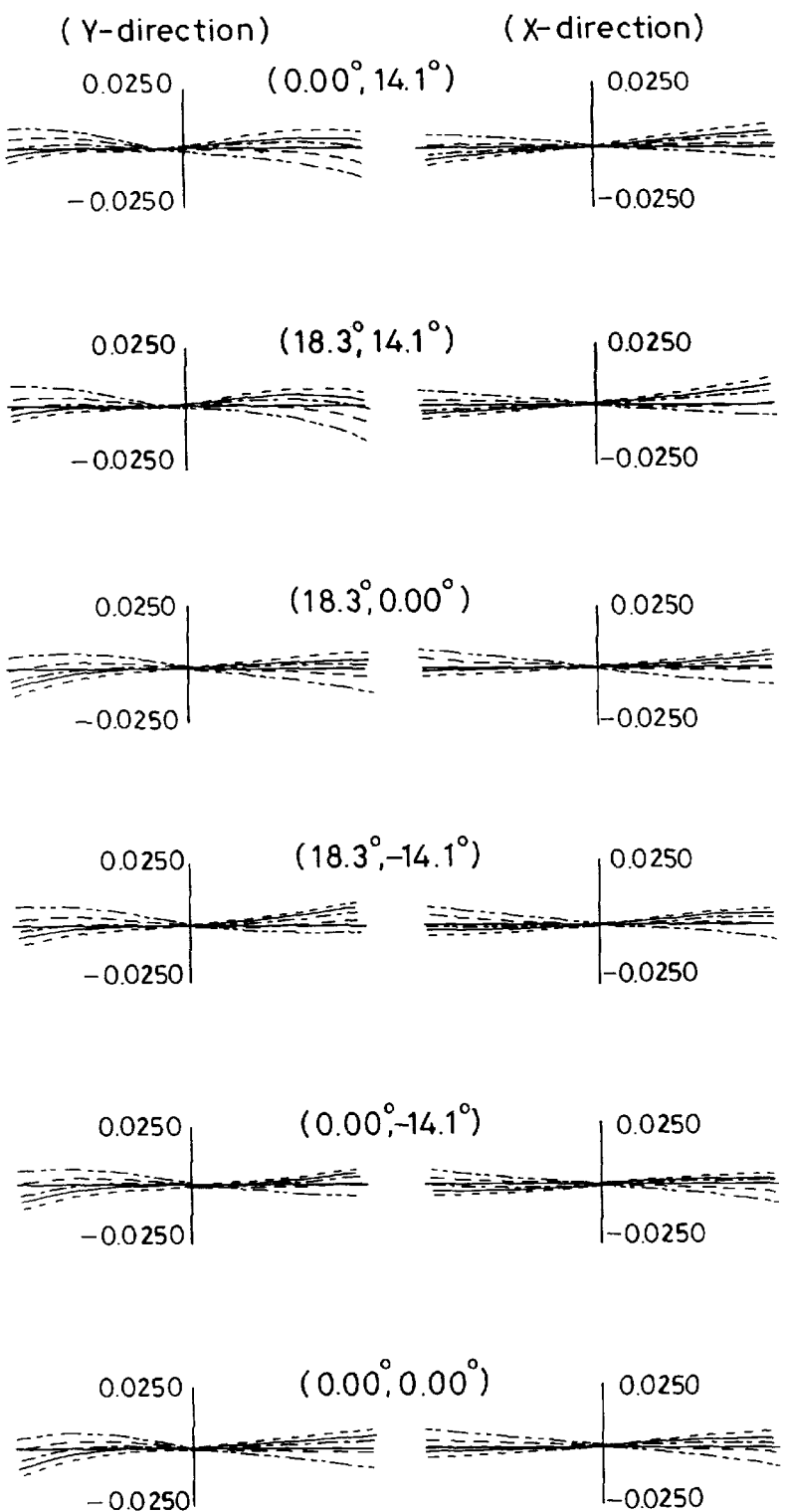
FIG. 10 is an aberrational diagram illustrating lateral aberrations in the image-forming optical system according to Example 5.
Figure 11:
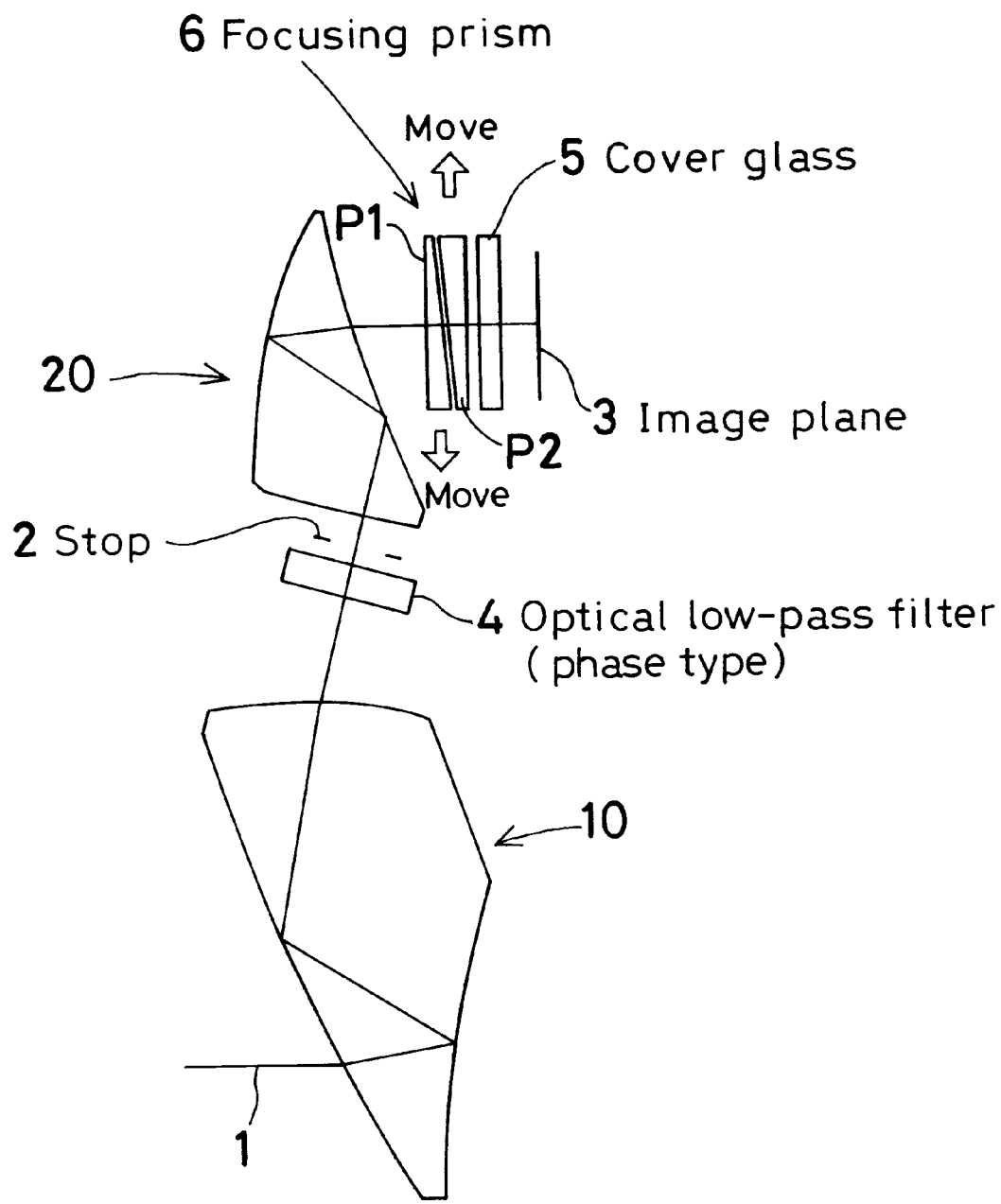
FIG. 11 is a diagram showing one example of a focusing mechanism used in the image-forming optical system according to the present invention.
Figure 12:
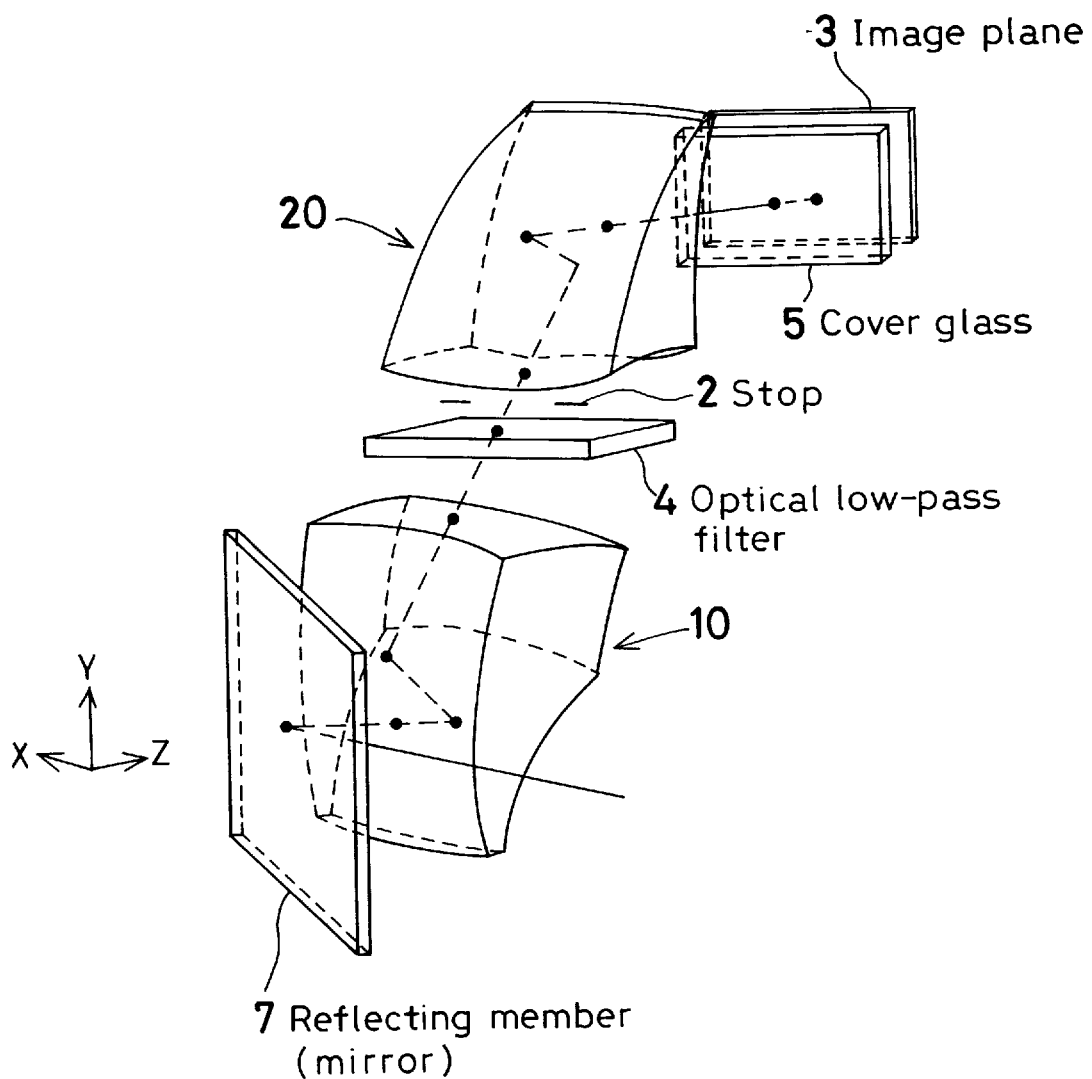
FIG. 12 is a sectional view showing a modification of the image-forming optical system according to the present invention that uses a reflecting member for folding an optical path.
Figure 13:
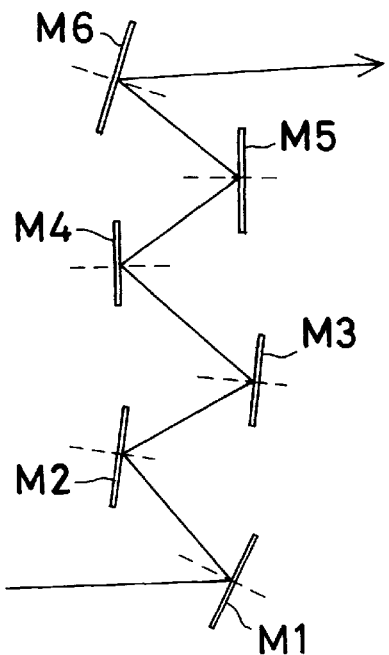
FIG. 13 is a ray path diagram showing an optical system having a large number of reflecting surfaces, on which the present invention is predicated.
Figure 14:
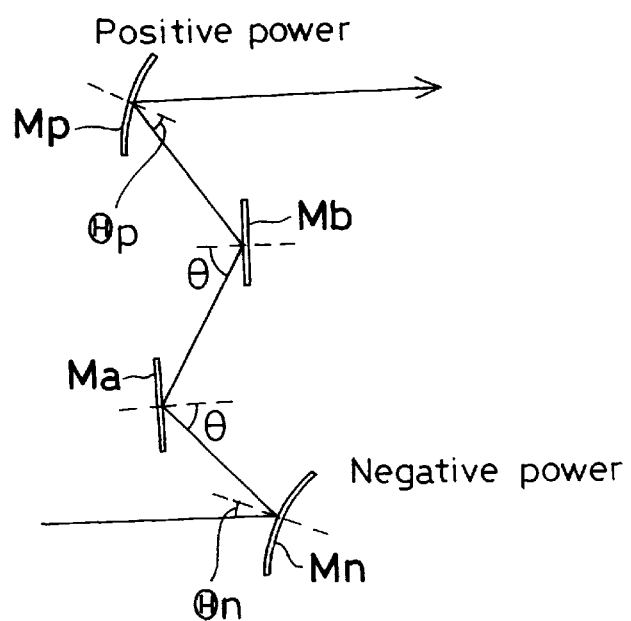
FIG. 14 is a conceptual view showing the reflecting surface arrangement in the image-forming optical system according to the present invention.

FIG. 5 is a sectional view of Example 5 taken along the YZ-plane containing the axial principal ray 1. In Example 5, the horizontal half field angle is 26.1 degrees, and the vertical half field angle is 20.2 degrees. The entrance pupil diameter is 1.78 millimeters. The image pickup device size is 2.45×1.84 millimeters. The focal length is equivalent to 5 millimeters in terms of the focal length of a rotationally symmetric optical system.

As shown in FIG. 5, Example 5 has, in order in which light passes from the object side, a first prism 10, an optical low-pass filter 4, a stop 2, a second prism 20, a cover glass 5 for protecting the imager surface, and an image plane 3 (imager light-receiving surface). The first prism 10 has a first transmitting surface 11 of positive power, a first reflecting surface 12 of negative power, a second reflecting surface 13 of positive power, and a second transmitting surface 14 of positive power. The second prism 20 has a first transmitting surface 21 of positive power, a first reflecting surface 22 of negative power, a second reflecting surface 23 of positive power, and a second transmitting surface 24 of negative power. The first transmitting surface 11 and second reflecting surface 13 of the first prism 10 are the identical optical surface having both transmitting and reflecting actions, and the first reflecting surface 22 and second transmitting surface 24 of the second prism 20 are the identical optical surface having both transmitting and reflecting actions. In the constituent parameters (shown later), the displacements of each of the surface Nos. 2 to 6 are expressed by the amounts of displacement from the decentration reference plane 1, and the displacements of each of the surface Nos. 9 to 13 are expressed by the amounts of displacement from the decentration reference plane 2. The image plane 3 is perpendicular to the Z-axis.

In this example, two prisms are placed in series in the Y-axis direction as in Example 4, thereby reducing the thickness in the Z-axis direction in particular. In this example, however, the optical low-pass filter, which is placed in the optical system and the image plane in Example 4, is placed between the two prisms 10 and 20, thereby further reducing the thickness in the Z-axis direction.

Constituent parameters of the above-described Examples 1 to 5 will be shown below. In the constituent parameters, free-form surfaces are denoted by "FFS", rotationally symmetric aspherical surfaces by "ASS", and hypothetic planes by "HRP".

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (HRP) | | | (Reference plane 1) | |
| 2 | FFS① | | (1) | 1.4924 | 57.6 |
| 3 | FFS②(Reflection surface) | | (2) | 1.4924 | 57.6 |
| 4 | FFS①(Reflection surface) | | (1) | 1.4924 | 57.6 |
| 5 | −45.38 | | (3) | | |
| 6 | ∞ (Stop) | | (4) | (Reference plane 2) | |
| 7 | FFS③ | | (5) | 1.4924 | 57.6 |
| 8 | FFS④(Reflection surface) | | (6) | 1.4924 | 57.6 |
| 9 | FFS③(Reflection surface) | | (5) | 1.4924 | 57.6 |
| 10 | 6.58 | | (7) | | |
| 11 | ∞ | 3.92 | (8) | 1.5163 | 64.1 |
| 12 | ∞ | 1.60 | | | |
| | (Optical low-pass filter) | | | | |
| 13 | ∞ | 0.75 | | 1.4875 | 70.2 |
| 14 | ∞ | 1.21 | | | |
| | (Cover glass) | | | | |
| Image plane | ∞ | | | | |

FFS①

| $C_4$ | $1.4613 \times 10^{-2}$ | $C_6$ | $6.2245 \times 10^{-3}$ | $C_8$ | $-3.0532 \times 10^{-5}$ |
| $C_{10}$ | $-2.9826 \times 10^{-4}$ | $C_{11}$ | $-1.0813 \times 10^{-5}$ | $C_{13}$ | $-1.0577 \times 10^{-4}$ |
| $C_{15}$ | $8.0954 \times 10^{-6}$ | $C_{17}$ | $5.2380 \times 10^{-6}$ | $C_{19}$ | $-1.6076 \times 10^{-6}$ |
| $C_{21}$ | $-7.2703 \times 10^{-7}$ | | | | |

FFS②

| $C_4$ | $3.6928 \times 10^{-2}$ | $C_6$ | $3.1729 \times 10^{-2}$ | $C_8$ | $8.7607 \times 10^{-4}$ |
| $C_{10}$ | $-1.2800 \times 10^{-3}$ | $C_{11}$ | $1.1565 \times 10^{-4}$ | $C_{13}$ | $-3.8845 \times 10^{-4}$ |
| $C_{15}$ | $2.0133 \times 10^{-4}$ | $C_{17}$ | $3.0894 \times 10^{-5}$ | $C_{19}$ | $-5.5457 \times 10^{-6}$ |
| $C_{21}$ | $-1.8279 \times 10^{-5}$ | | | | |

FFS③

| $C_4$ | $-1.0642 \times 10^{-2}$ | $C_6$ | $-7.9427 \times 10^{-4}$ | $C_8$ | $1.5773 \times 10^{-3}$ |
| $C_{10}$ | $-3.7214 \times 10^{-6}$ | $C_{11}$ | $2.3078 \times 10^{-5}$ | $C_{13}$ | $-4.1962 \times 10^{-4}$ |
| $C_{15}$ | $-1.9714 \times 10^{-5}$ | $C_{17}$ | $3.8075 \times 10^{-6}$ | $C_{19}$ | $2.0493 \times 10^{-5}$ |
| $C_{21}$ | $9.9012 \times 10^{-7}$ | | | | |

FFS④

| $C_4$ | $-2.7459 \times 10^{-2}$ | $C_6$ | $-2.0524 \times 10^{-2}$ | $C_8$ | $5.4460 \times 10^{-4}$ |
| $C_{10}$ | $1.0168 \times 10^{-4}$ | $C_{11}$ | $-1.1196 \times 10^{-5}$ | $C_{13}$ | $-1.7929 \times 10^{-4}$ |
| $C_{15}$ | $-3.5280 \times 10^{-5}$ | $C_{17}$ | $3.8398 \times 10^{-6}$ | $C_{19}$ | $-1.7291 \times 10^{-5}$ |
| $C_{21}$ | $-2.5752 \times 10^{-6}$ | | | | |

Displacement and tilt (1)

| X | 0.00 | Y | 5.17 | Z | 2.09 |
| α | 14.73 | β | 0.00 | γ | 0.00 |

Displacement and tilt (2)

| X | 0.00 | Y | 0.57 | Z | 8.35 |
| α | −14.68 | β | 0.00 | γ | 0.00 |

-continued

|   |   |   | Displacement and tilt (3) |   |   |
|---|---|---|---|---|---|
| X | 0.00 | Y | 11.28 | Z | 4.84 |
| α | 57.42 | β | 0.00 | γ | 0.00 |
|   |   |   | Displacement and tilt (4) |   |   |
| X | 0.00 | Y | 15.97 | Z | 6.55 |
| α | 69.93 | β | 0.00 | γ | 0.00 |
|   |   |   | Displacement and tilt (5) |   |   |
| X | 0.00 | Y | −2.33 | Z | 1.00 |
| α | −19.55 | β | 0.00 | γ | 0.00 |
|   |   |   | Displacement and tilt (6) |   |   |
| X | 0.00 | Y | −0.29 | Z | 4.41 |
| α | 12.18 | β | 0.00 | γ | 0.00 |
|   |   |   | Displacement and tilt (7) |   |   |
| X | 0.00 | Y | −5.02 | Z | 1.98 |
| α | −70.01 | β | 0.00 | γ | 0.00 |
|   |   |   | Displacement and tilt (8) |   |   |
| X | 0.00 | Y | −6.25 | Z | 2.43 |
| α | −69.93 | β | 0.00 | γ | 0.00 |

$|\theta| = 51.04°$ (No. 4 surface)
$|\Theta n| = 21.62°$ (No. 3 surface)
$|\Theta p| = 18.67°$ (No. 8 surface)

Example 2

| Surface No. Object plane | Radius of curvature | Surface separation | Displacement and tilt | Refractive index | Abbe's No. |
|---|---|---|---|---|---|
|   | ∞ | ∞ |   |   |   |
| 1 | ∞ (HRP) |   |   | (Reference plane 1) |   |
| 2 | FFS① |   | (1) | 1.4924 | 57.6 |
| 3 | FFS②(Reflection surface) |   | (2) | 1.4924 | 57.6 |
| 4 | FFS①(Reflection surface) |   | (1) | 1.4924 | 57.6 |
| 5 | −16.16 |   | (3) |   |   |
| 6 | ∞ (Stop) |   | (4) | (Reference plane 2) |   |
| 7 | −7.81 |   | (5) | 1.4924 | 57.6 |
| 8 | FFS③(Reflection surface) |   | (6) | 1.4924 | 57.6 |
| 9 | FFS④(Reflection surface) |   | (7) | 1.4924 | 57.6 |
| 10 | FFS③ |   | (6) |   |   |
| 11 | ∞ | 3.92 | (8) | 1.5163 | 64.1 |
| 12 | ∞ | 1.60 |   |   |   |
|   | (Optical low-pass filter) |   |   |   |   |
| 13 | ∞ | 0.75 |   | 1.4875 | 70.2 |
| 14 | ∞ | 1.21 |   |   |   |
|   | (Cover glass) |   |   |   |   |
| Image plane |   |   |   |   |   |

FFS①

| $C_4$ | $1.9244 \times 10^{-2}$ | $C_6$ | $1.1849 \times 10^{-2}$ | $C_8$ | $-1.5511 \times 10^{-4}$ |
| $C_{10}$ | $-3.8177 \times 10^{-4}$ | $C_{11}$ | $7.3237 \times 10^{-6}$ | $C_{13}$ | $-7.9131 \times 10^{-5}$ |
| $C_{15}$ | $2.4542 \times 10^{-5}$ | $C_{17}$ | $4.9270 \times 10^{-6}$ | $C_{19}$ | $-9.1234 \times 10^{-6}$ |
| $C_{21}$ | $-1.5933 \times 10^{-6}$ |   |   |   |   |

FFS②

| $C_4$ | $2.7507 \times 10^{-2}$ | $C_6$ | $3.0053 \times 10^{-2}$ | $C_8$ | $-3.3919 \times 10^{-4}$ |
| $C_{10}$ | $-1.4673 \times 10^{-3}$ | $C_{11}$ | $5.6942 \times 10^{-5}$ | $C_{13}$ | $-1.4033 \times 10^{-4}$ |
| $C_{15}$ | $2.3630 \times 10^{-4}$ | $C_{17}$ | $1.8529 \times 10^{-5}$ | $C_{19}$ | $-3.2402 \times 10^{-5}$ |
| $C_{21}$ | $-2.1470 \times 10^{-5}$ |   |   |   |   |

FFS③

| $C_4$ | $1.7705 \times 10^{-2}$ | $C_6$ | $3.0784 \times 10^{-3}$ | $C_8$ | $6.4270 \times 10^{-4}$ |
| $C_{10}$ | $-1.8205 \times 10^{-4}$ | $C_{11}$ | $-2.4000 \times 10^{-6}$ | $C_{13}$ | $-2.4798 \times 10^{-4}$ |
| $C_{15}$ | $-1.4198 \times 10^{-6}$ | $C_{17}$ | $-2.6225 \times 10^{-5}$ | $C_{19}$ | $-2.0413 \times 10^{-5}$ |
| $C_{21}$ | $5.4931 \times 10^{-7}$ |   |   |   |   |

-continued

Example 2

FFS④

| | | | | | |
|---|---|---|---|---|---|
| $C_4$ | $3.5229 \times 10^{-2}$ | $C_6$ | $2.4376 \times 10^{-2}$ | $C_8$ | $-4.9444 \times 10^{-5}$ |
| $C_{10}$ | $-4.1929 \times 10^{-4}$ | $C_{11}$ | $6.2415 \times 10^{-5}$ | $C_{13}$ | $-7.9026 \times 10^{-5}$ |
| $C_{15}$ | $2.5936 \times 10^{-5}$ | $C_{17}$ | $-1.0573 \times 10^{-5}$ | $C_{19}$ | $1.1498 \times 10^{-6}$ |
| $C_{21}$ | $-4.1773 \times 10^{-6}$ | | | | |

Displacement and tilt (1)

| X | 0.00 | Y | 4.81 | Z | 3.69 |
|---|---|---|---|---|---|
| α | −22.99 | β | 0.00 | γ | 0.00 |

Displacement and tilt (2)

| X | 0.00 | Y | −0.24 | Z | 5.06 |
|---|---|---|---|---|---|
| α | −39.64 | β | 0.00 | γ | 3.00 |

Displacement and tilt (3)

| X | 0.00 | Y | 7.40 | Z | 8.38 |
|---|---|---|---|---|---|
| α | 34.68 | β | 0.00 | γ | 0.00 |

Displacement and tilt (4)

| X | 0.00 | Y | 8.27 | Z | 10.18 |
|---|---|---|---|---|---|
| α | 25.91 | β | 0.00 | γ | 0.00 |

Displacement and tilt (5)

| X | 0.00 | Y | 0.00 | Z | 1.53 |
|---|---|---|---|---|---|
| α | 12.79 | β | 0.00 | γ | 0.00 |

Displacement and tilt (6)

| X | 0.00 | Y | 0.18 | Z | 3.97 |
|---|---|---|---|---|---|
| α | 56.47 | β | 0.00 | γ | 0.00 |

Displacement and tilt (7)

| X | 0.00 | Y | −3.80 | Z | 5.31 |
|---|---|---|---|---|---|
| α | 85.35 | β | 0.00 | γ | 0.00 |

Displacement and tilt (8)

| X | 0.00 | Y | 0.31 | Z | 7.42 |
|---|---|---|---|---|---|
| α | 64.09 | β | 0.00 | γ | 0.00 |

|θ| = 51.80° (No. 4 surface)
|θ| = 52.21° (No. 8 surface)
|Θn| = 35.15° (No. 3 surface)
|Θp| = 23.33° (No. 9 surface)

EXAMPLE 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (HRP) | | | (Reference plane 1) | |
| 2 | FFS① | | (1) | 1.4924 | 57.6 |
| 3 | FFS②(Reflection surface) | | (2) | 1.4924 | 57.6 |
| 4 | FFS①(Reflection surface) | | (1) | 1.4924 | 57.6 |
| 5 | −11.37 | | (3) | | |
| 6 | ∞ (Stop) | | (4) | (Reference plane 2) | |
| 7 | FFS③ | | (5) | 1.4924 | 57.6 |
| 8 | FFS④(Reflection surface) | | (6) | 1.4924 | 57.6 |
| 9 | FFS③(Reflection surface) | | (5) | 1.4924 | 57.6 |
| 10 | −7.57 | | (7) | | |
| 11 | ∞ | 3.92 | (8) | 1.5163 | 64.1 |
| 12 | ∞ | 1.60 | | | |
| | (Optical low-pass filter) | | | | |
| 13 | ∞ | 0.75 | | 1.4875 | 70.2 |
| 14 | ∞ | 1.21 | | | |
| | (Cover glass) | | | | |
| Image plane | | | | | |

-continued

FFS①

| | | | | |
|---|---|---|---|---|
| $C_4$ | $9.3678 \times 10^{-3}$ | $C_6$ | $6.9426 \times 10^{-3}$ | |

FFS②

| | | | | |
|---|---|---|---|---|
| $C_4$ | $3.1895 \times 10^{-2}$ | $C_6$ | $3.4349 \times 10^{-2}$ | |

FFS③

| | | | | |
|---|---|---|---|---|
| $C_4$ | $-2.5219 \times 10^{-2}$ | $C_6$ | $-8.9719 \times 10^{-3}$ | |

FFS④

| | | | | |
|---|---|---|---|---|
| $C_4$ | $-2.8006 \times 10^{-2}$ | $C_6$ | $-1.7555 \times 10^{-2}$ | |

Displacement and tilt (1)

| X | 0.00 | Y | 2.28 | Z | 1.09 |
|---|---|---|---|---|---|
| α | 12.21 | β | 0.00 | γ | 0.00 |

Displacement and tilt (2)

| X | 0.00 | Y | 0.17 | Z | 3.66 |
|---|---|---|---|---|---|
| α | -17.35 | β | 0.00 | γ | 0.00 |

Displacement and tilt (3)

| X | 0.00 | Y | 8.29 | Z | 4.05 |
|---|---|---|---|---|---|
| α | 56.52 | β | 0.00 | γ | 0.00 |

Displacement and tilt (4)

| X | 0.00 | Y | 12.91 | Z | 5.97 |
|---|---|---|---|---|---|
| α | 67.47 | β | 0.00 | γ | 0.00 |

Displacement and tilt (5)

| X | 0.00 | Y | 3.66 | Z | 2.11 |
|---|---|---|---|---|---|
| α | -14.84 | β | 0.00 | γ | 0.00 |

Displacement and tilt (6)

| X | 0.00 | Y | -0.30 | Z | 3.66 |
|---|---|---|---|---|---|
| α | -37.42 | β | 0.00 | γ | 0.00 |

Displacement and tilt (7)

| X | 0.00 | Y | 5.94 | Z | 4.94 |
|---|---|---|---|---|---|
| α | 30.44 | β | 0.00 | γ | 0.00 |

Displacement and tilt (8)

| X | 0.00 | Y | 6.73 | Z | 5.78 |
|---|---|---|---|---|---|
| α | 43.06 | β | 0.00 | γ | 0.00 |

$|\theta| = 50.68°$ (No. 4 surface)
$|\theta| = 54.14°$ (No. 9 surface)
$|\Theta n| = 21.69°$ (No. 3 surface)
$|\Theta p| = 30.22°$ (No. 8 surface)

EXAMPLE 4

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (HRP) | | | (Reference plane 1) | |
| 2 | FFS① | | (1) | 1.4924 | 57.6 |
| 3 | FFS②(Reflection surface) | | (2) | 1.4924 | 57.6 |
| 4 | FFS①(Reflection surface) | | (1) | 1.4924 | 57.6 |
| 5 | AAS① | | (3) | | |
| 6 | ∞ (Stop) | | (4) | (Reference plane 2) | |
| 7 | AAS② | | (5) | 1.4924 | 57.6 |
| 8 | FFS③(Reflection surface) | | (6) | 1.4924 | 57.6 |
| 9 | FFS④(Reflection surface) | | (7) | 1.4924 | 57.6 |
| 10 | FFS③ | | (6) | | |
| 11 | ∞ | 3.92 | (8) | 1.5163 | 64.1 |
| 12 | ∞ | 1.60 | | | |
| | (Optical low-pass filter) | | | | |

-continued

| | | | | | |
|---|---|---|---|---|---|
| 13 | ∞ | | 0.75 | 1.4875 | 70.2 |
| 14 | ∞ | | 1.21 | | |
| | (Cover glass) | | | | |
| Image plane | | | | | |

ASS①

| | R | −14.42 |
|---|---|---|
| | K | 0.0000 |
| | A | −1.0257×10$^{-4}$ |
| | B | 2.8655×10$^{-4}$ |
| | C | −7.4787×10$^{-5}$ |
| | D | 8.9294×10$^{-6}$ |

ASS②

| | R | −11.69 |
|---|---|---|
| | K | 0.0000 |
| | A | 4.5111×10$^{-4}$ |
| | B | 1.5733×10$^{-4}$ |
| | C | −6.1892×10$^{-5}$ |
| | D | 9.9766×10$^{-6}$ |

FFS①

| $C_4$ | 1.0388 × 10$^{-2}$ | $C_6$ | 8.2612 × 10$^{-3}$ | $C_8$ | −4.1018 × 10$^{-5}$ |
|---|---|---|---|---|---|
| $C_{10}$ | −7.1714 × 10$^{-5}$ | $C_{11}$ | 1.0838 × 10$^{-5}$ | $C_{13}$ | −8.5294 × 10$^{-5}$ |
| $C_{15}$ | −1.0955 × 10$^{-7}$ | $C_{17}$ | 1.5078 × 10$^{-6}$ | $C_{19}$ | −9.3071 × 10$^{-6}$ |
| $C_{21}$ | −1.1611 × 10$^{-6}$ | | | | |

FFS②

| $C_4$ | 1.3562 × 10$^{-2}$ | $C_6$ | 2.1363 × 10$^{-2}$ | $C_8$ | −3.8587 × 10$^{-4}$ |
|---|---|---|---|---|---|
| $C_{10}$ | −5.7765 × 10$^{-4}$ | $C_{11}$ | 2.8930 × 10$^{-5}$ | $C_{13}$ | 1.6406 × 10$^{-7}$ |
| $C_{15}$ | 8.8155 × 10$^{-5}$ | $C_{17}$ | 2.7577 × 10$^{-6}$ | $C_{19}$ | 1.6458 × 10$^{-5}$ |
| $C_{21}$ | −2.2498 × 10$^{-6}$ | | | | |

FFS③

| $C_4$ | 2.0687 × 10$^{-2}$ | $C_6$ | 1.1335 × 10$^{-2}$ | $C_8$ | 2.8094 × 10$^{-4}$ |
|---|---|---|---|---|---|
| $C_{10}$ | 4.2599 × 10$^{-4}$ | $C_{11}$ | 5.3094 × 10$^{-5}$ | $C_{13}$ | −4.2716 × 10$^{-4}$ |
| $C_{15}$ | 2.1389 × 10$^{-5}$ | $C_{17}$ | 7.7876 × 10$^{-6}$ | $C_{19}$ | 4.8908 × 10$^{-5}$ |
| $C_{21}$ | −1.0969 × 10$^{-6}$ | | | | |

FFS④

| $C_4$ | 3.4980 × 10$^{-2}$ | $C_6$ | 2.9056 × 10$^{-2}$ | $C_8$ | 5.6509 × 10$^{-4}$ |
|---|---|---|---|---|---|
| $C_{10}$ | 7.6247 × 10$^{-4}$ | $C_{11}$ | 5.7910 × 10$^{-5}$ | $C_{13}$ | −1.7117 × 10$^{-4}$ |
| $C_{15}$ | 9.7384 × 10$^{-5}$ | $C_{17}$ | 1.3996 × 10$^{-5}$ | $C_{19}$ | 6.6985 × 10$^{-6}$ |
| $C_{21}$ | 1.5475 × 10$^{-5}$ | | | | |

Displacement and tilt (1)

| X | 0.00 | Y | 8.47 | Z | 3.00 |
|---|---|---|---|---|---|
| α | 19.18 | β | 0.00 | γ | 0.00 |

Displacement and tilt (2)

| X | 0.00 | Y | 1.23 | Z | 13.24 |
|---|---|---|---|---|---|
| α | −12.18 | β | 0.00 | γ | 0.00 |

Displacement and tilt (3)

| X | 0.00 | Y | 11.95 | Z | 3.60 |
|---|---|---|---|---|---|
| α | 78.34 | β | 0.00 | γ | 0.00 |

Displacement and tilt (4)

| X | 0.00 | Y | 12.81 | Z | 4.30 |
|---|---|---|---|---|---|
| α | 72.09 | β | 0.00 | γ | 0.00 |

Displacement and tilt (5)

| X | 0.00 | Y | 0.63 | Z | 1.23 |
|---|---|---|---|---|---|
| α | −1.57 | β | 0.00 | γ | 0.00 |

Displacement and tilt (6)

| X | 0.00 | Y | −0.07 | Z | 3.67 |
|---|---|---|---|---|---|
| α | −54.02 | β | 0.00 | γ | 0.00 |

Displacement and tilt (7)

| X | 0.00 | Y | 3.15 | Z | 4.62 |
|---|---|---|---|---|---|
| α | −86.82 | β | 0.00 | γ | 0.00 |

Displacement and tilt (8)

| X | 0.00 | Y | −0.41 | Z | 5.96 |
|---|---|---|---|---|---|
| α | −72.09 | β | 0.00 | γ | 0.00 |

-continued

| $\|\theta\| = 54.45°$ (No. 4 surface) |
| $\|\theta\| = 52.50°$ (No. 8 surface) |
| $\|\Theta n\| = 23.09°$ (No. 3 surface) |
| $\|\Theta p\| = 19.70°$ (No. 9 surface) |

EXAMPLE 5

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (HRP) | | | (Reference plane 1) | |
| 2 | FFS① | | (1) | 1.4924 | 57.6 |
| 3 | FFS②(Reflection surface) | | (2) | 1.4924 | 57.6 |
| 4 | FFS①(Reflection surface) | | (1) | 1.4924 | 57.6 |
| 5 | AAS① | | (3) | | |
| 6 | ∞ | 1.00 | (4) | 1.4924 | 57.6 |
| 7 | ∞ | 0.50 | | | |
| | (Optical low-pass filter) | | | | |
| 8 | ∞ (Stop) | | | (Reference plane 2) | |
| 9 | AAS② | | (5) | 1.4924 | 57.6 |
| 10 | FFS③(Reflection surface) | | (6) | 1.4924 | 57.6 |
| 11 | FFS④(Reflection surface) | | (7) | 1.4924 | 57.6 |
| 12 | FFS③ | | (6) | | |
| 13 | ∞ | 0.75 | (8) | 1.4875 | 70.2 |
| 14 | ∞ | 1.21 | | | |
| | (Cover glass) | | | | |
| Image plane | ∞ | | | | |

ASS①

| R | −10.49 |
| K | 0.0000 |
| A | $5.2214 \times 10^{-4}$ |
| B | $-6.7502 \times 10^{-6}$ |
| C | $1.0772 \times 10^{-7}$ |
| D | $7.4802 \times 10^{-10}$ |

ASS②

| R | 57.47 |
| K | 0.0000 |
| A | $-6.1371 \times 10^{-4}$ |
| B | $1.2295 \times 10^{-4}$ |
| C | $-7.7742 \times 10^{-6}$ |
| D | $1.9392 \times 10^{-7}$ |

FFS①

| $C_4$ | $7.5659 \times 10^{-3}$ | $C_6$ | $5.3214 \times 10^{-3}$ | $C_8$ | $2.7154 \times 10^{-6}$ |
| $C_{10}$ | $-1.5688 \times 10^{-4}$ | $C_{11}$ | $-5.9866 \times 10^{-6}$ | $C_{13}$ | $-1.7885 \times 10^{-5}$ |
| $C_{15}$ | $9.9915 \times 10^{-6}$ | $C_{17}$ | $3.8000 \times 10^{-6}$ | $C_{19}$ | $-6.7284 \times 10^{-7}$ |
| $C_{21}$ | $-7.8944 \times 10^{-7}$ | | | | |

FFS②

| $C_4$ | $1.1526 \times 10^{-2}$ | $C_6$ | $1.4919 \times 10^{-2}$ | $C_8$ | $-5.5383 \times 10^{-5}$ |
| $C_{10}$ | $-7.2358 \times 10^{-4}$ | $C_{11}$ | $-7.1249 \times 10^{-6}$ | $C_{13}$ | $-2.3850 \times 10^{-5}$ |
| $C_{15}$ | $1.2330 \times 10^{-4}$ | $C_{17}$ | $5.4705 \times 10^{-6}$ | $C_{19}$ | $1.5897 \times 10^{-7}$ |
| $C_{21}$ | $-1.0464 \times 10^{-5}$ | | | | |

FFS③

| $C_4$ | $1.3738 \times 10^{-2}$ | $C_6$ | $6.5702 \times 10^{-3}$ | $C_8$ | $-5.7296 \times 10^{-5}$ |
| $C_{10}$ | $2.7755 \times 10^{-4}$ | $C_{11}$ | $-7.9287 \times 10^{-7}$ | $C_{13}$ | $7.7747 \times 10^{-5}$ |
| $C_{15}$ | $1.0930 \times 10^{-4}$ | $C_{17}$ | $2.2154 \times 10^{-5}$ | $C_{19}$ | $-2.3262 \times 10^{-5}$ |
| $C_{21}$ | $-7.0973 \times 10^{-6}$ | | | | |

FFS④

| $C_4$ | $3.3952 \times 10^{-2}$ | $C_6$ | $2.9239 \times 10^{-2}$ | $C_8$ | $3.3825 \times 10^{-4}$ |
| $C_{10}$ | $5.5450 \times 10^{-4}$ | $C_{11}$ | $2.8519 \times 10^{-5}$ | $C_{13}$ | $3.7704 \times 10^{-5}$ |
| $C_{15}$ | $2.4129 \times 10^{-4}$ | $C_{17}$ | $5.3023 \times 10^{-6}$ | $C_{19}$ | $4.6990 \times 10^{-7}$ |
| $C_{21}$ | $2.0372 \times 10^{-5}$ | | | | |

-continued

| | | Displacement and tilt (1) | | | |
|---|---|---|---|---|---|
| X | 0.00 | Y | 4.19 | Z | 0.00 |
| α | 23.45 | β | 0.00 | γ | 0.00 |
| | | Displacement and tilt (2) | | | |
| X | 0.00 | Y | 0.61 | Z | 5.67 |
| α | −11.46 | β | 0.00 | γ | 0.00 |
| | | Displacement and tilt (3) | | | |
| X | 0.00 | Y | 11.22 | Z | 3.56 |
| α | 78.95 | β | 0.00 | γ | 0.00 |
| | | Displacement and tilt (4) | | | |
| X | 0.00 | Y | 14.79 | Z | 2.36 |
| α | 73.81 | β | 0.00 | γ | 0.00 |
| | | Displacement and tilt (5) | | | |
| X | 0.00 | Y | −1.91 | Z | 1.35 |
| α | 8.36 | β | 0.00 | γ | 0.00 |
| | | Displacement and tilt (6) | | | |
| X | 0.00 | Y | 0.11 | Z | 4.06 |
| α | −53.12 | β | 0.00 | γ | 0.00 |
| | | Displacement and tilt (7) | | | |
| X | 0.00 | Y | 4.11 | Z | 5.39 |
| α | −88.14 | β | 0.00 | γ | 0.00 |
| | | Displacement and tilt (8) | | | |
| X | 0.00 | Y | −0.34 | Z | 6.96 |
| α | −73.81 | β | 0.00 | γ | 0.00 |

|θ| = 55.73° (No. 4 surface)
|θ| = 55.32° (No. 10 surface)
|Θn| = 20.81° (No. 3 surface)
|Θp| = 20.30° (No. 11 surface)

FIGS. 6 to 10 are aberrational diagrams showing lateral aberrations in the above-described Examples 1 to 5. In these aberrational diagrams, the numerals in the parentheses denote [horizontal (X-direction) field angle, vertical (Y-direction) field angle], and lateral aberrations at the field angles are shown. Each aberrational diagram shows, in order from the bottom toward the top of the diagram, lateral aberrations in the center of the image field; lateral aberrations at the position of minus about 70% of the image height on the Y-axis; lateral aberrations at the position of about 70% of the image height in the X-direction and minus about 70% of the image height in the Y-direction; lateral aberrations at the position of about 70% of the image height on the X-axis; lateral aberrations at the position of about 70% of the image height in the X-direction and about 70% of the image height in the Y-direction; and lateral aberrations at the position of about 70% of the image height on the Y-axis.

Incidentally, the above-described image-forming optical system according to the present invention can be used in photographic apparatuses in which an object image formed by the image-forming optical system is received with an image pickup device, such as a CCD or a silver halide film, to take a photograph of the object. In particular, the image-forming optical system can be used in cameras and endoscopes. It is also possible to use the image-forming optical system as an objective optical system of an observation apparatus in which an object image is viewed through an ocular lens, particularly a finder unit of a camera. Embodiments in which the present invention is applied to such apparatuses will be described below.

Figure 15:
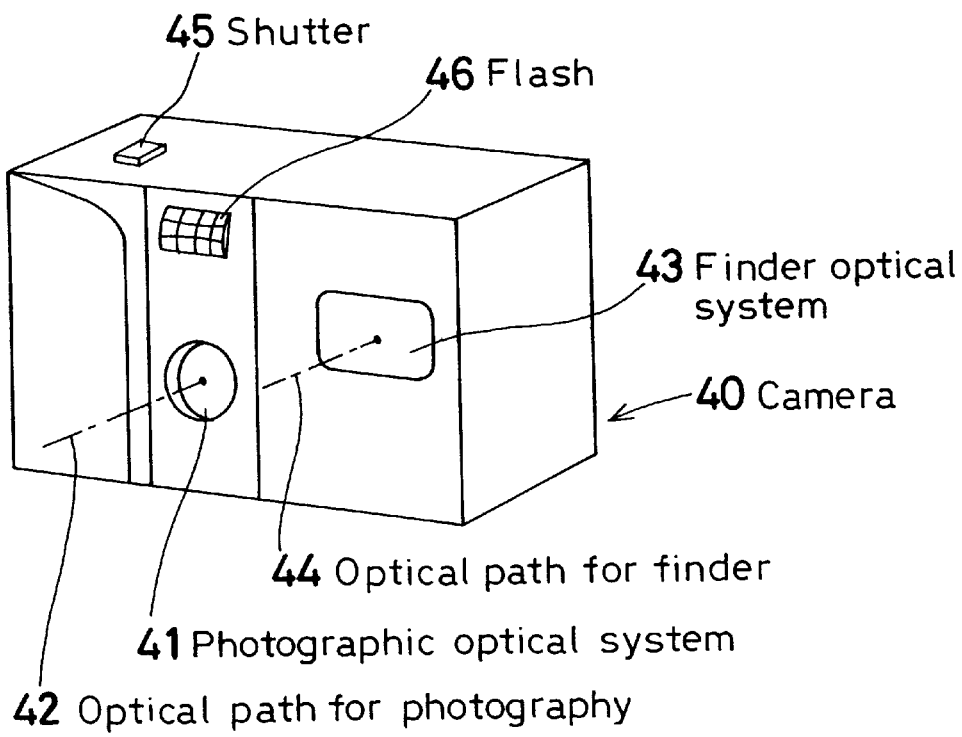
FIG. 15 is a perspective view showing the external appearance of an electronic camera to which the image-forming optical system according to the present invention is applied, as viewed from the front side thereof.
Figure 16:
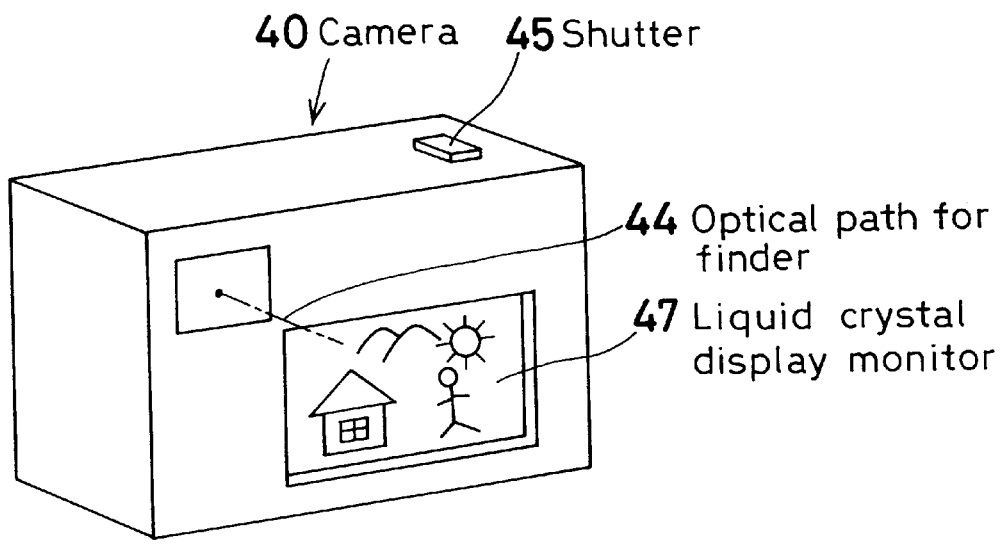
FIG. 16 is a perspective view of the electronic camera shown in FIG. 15, as viewed from the rear side thereof.
Figure 17:
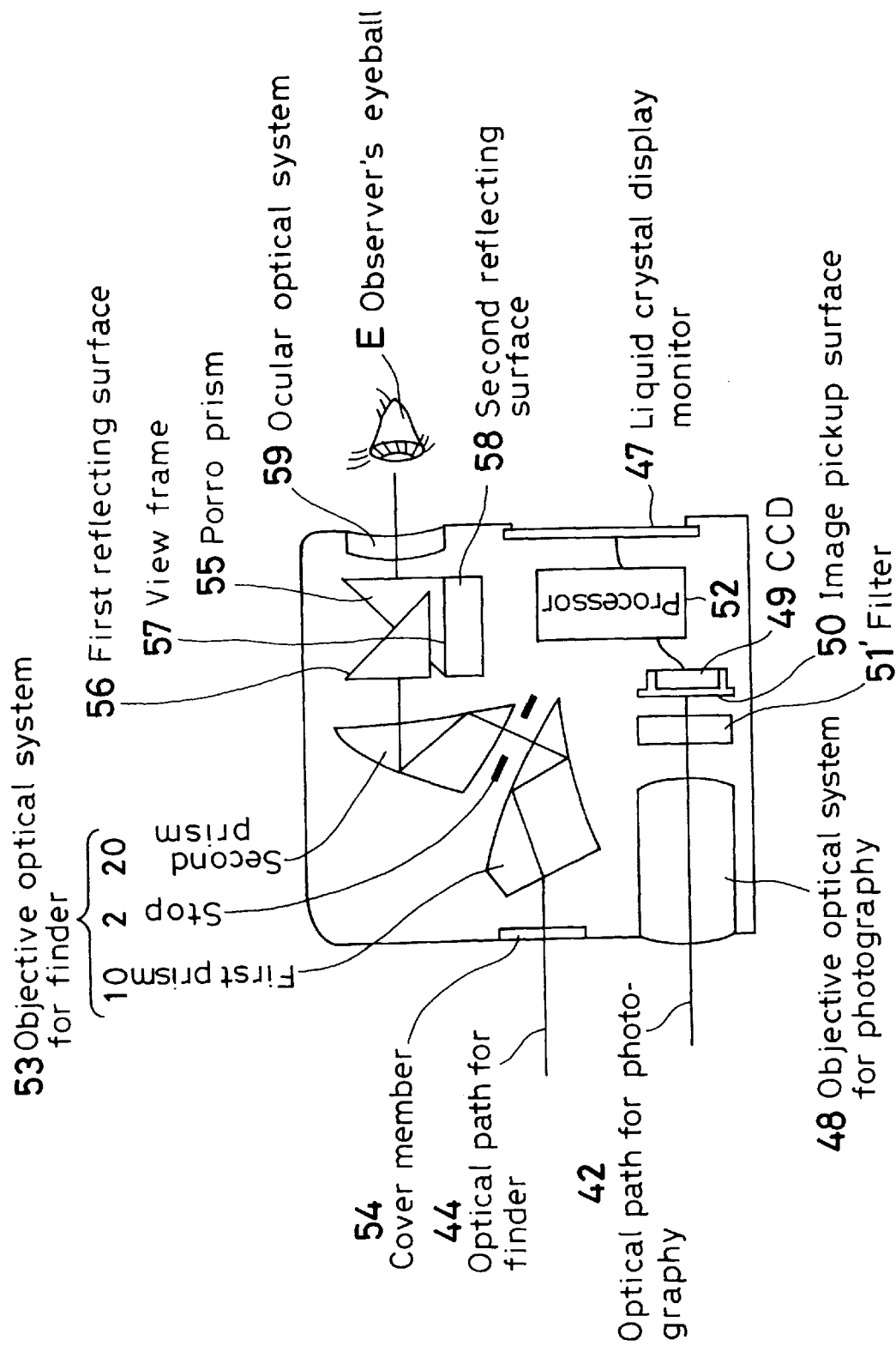
FIG. 17 is a sectional view showing the arrangement of the electronic camera in FIG. 15.

FIGS. 15 to 17 are conceptual views showing an arrangement in which the image-forming optical system according to the present invention is incorporated into an objective optical system of a finder unit of an electronic camera. FIG. 15 is a perspective view showing the external appearance of an electronic camera 40 as viewed from the front side thereof. FIG. 16 is a perspective view of the electronic camera 40 as viewed from the rear side thereof. FIG. 17 is a sectional view showing the arrangement of the electronic camera 40. In the illustrated example, the electronic camera 40 includes a photographic optical system 41 having an optical path 42 for photography, a finder optical system 43 having an optical path 44 for the finder, a shutter 45, a flash 46, a liquid crystal display monitor 47, etc. When the shutter 45, which is placed on the top of the camera 40, is depressed, photography is performed through an objective optical system 48 for photography. An object image produced by the objective optical system 48 for photography is formed on an image pickup surface 50 of a CCD 49 through a filter 51', e.g. a low-pass filter or an infrared cutoff filter. The object image received by the CCD 49 is processed in a processor 52 and displayed as an electronic image on the liquid crystal display monitor 47, which is provided on the rear of the camera 40. The processor 52 is provided with a memory or the like to enable the photographed electronic image to be recorded. It should be noted that the memory may be provided separately from the processor 52. The arrangement may also be such that the photographed electronic image is electronically recorded or written on a floppy disk or the like. The camera may be arranged in the form of a silver halide camera in which a silver halide film is disposed in place of the CCD 49.

Furthermore, the image-forming optical system according to the present invention is placed in the optical path 44 for the finder as an objective optical system 53 for the finder.

The objective optical system 53 is provided with a cover member 54. An object image produced by the objective optical system 53 for the finder is formed on a view frame 57 of a Porro prism 55, which is an image-erecting member. It should be noted that the view frame 57 is placed between a first reflecting surface 56 and second reflecting surface 58 of the Porro prism 55. An ocular optical system 59 is placed behind the Porro prism 55 to lead an erect image to an observer's eyeball E.

In the camera 40, which is arranged as stated above, the objective optical system 53 for the finder can be constructed with a minimal number of optical members. Accordingly, a high-performance and low-cost camera can be realized. In addition, because the optical path of the objective optical system 53 can be folded, the degree of freedom with which the constituent elements can be arranged in the camera increases. This is favorable for design.

Although in this example a plane-parallel plate is placed as the cover member 54 of the objective optical system 53 for the finder, it is also possible to use a lens having a power as the cover member 54.

Figure 18:
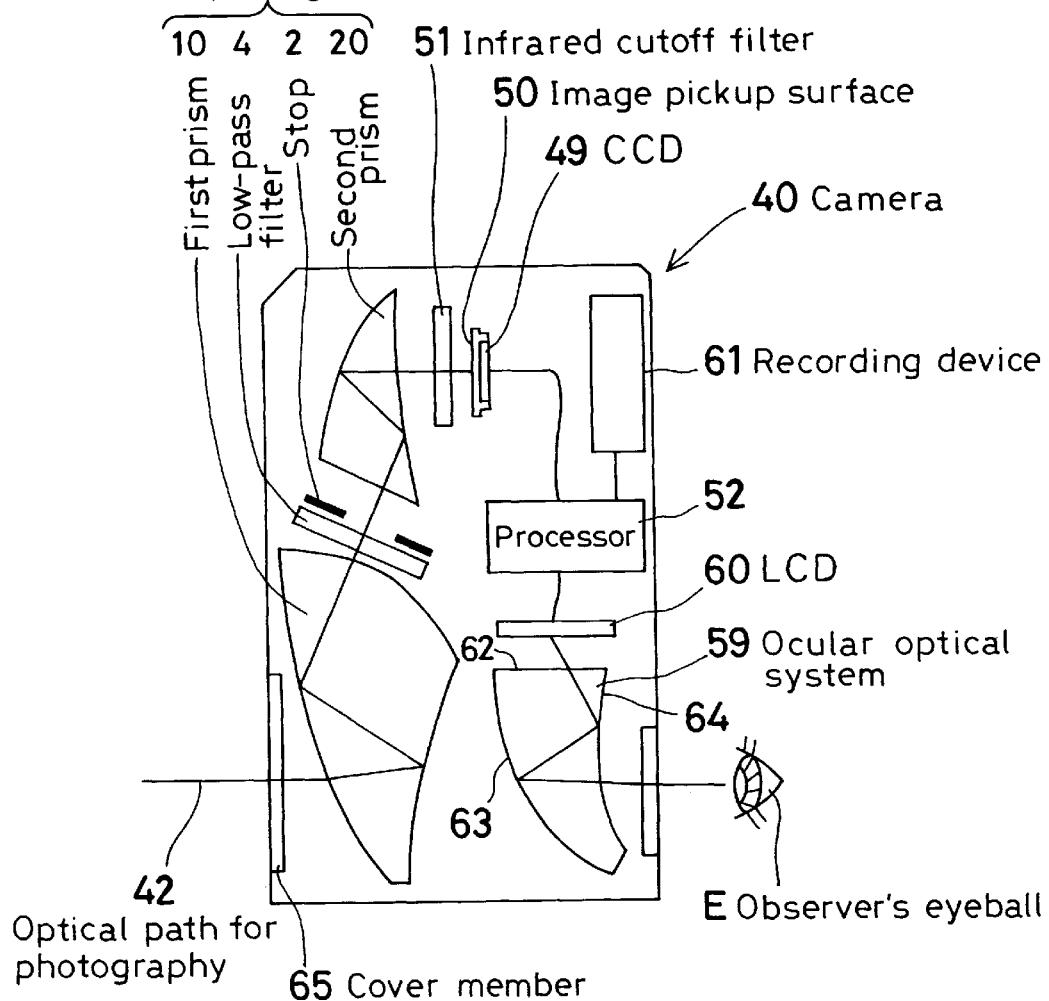
FIG. 18 is a conceptual view of another electronic camera to which the image-forming optical system according to the present invention is applied.

FIG. 18 is a conceptual view showing an arrangement in which the image-forming optical system according to the present invention is incorporated into an objective optical system 48 of a photography part of an electronic camera 40. An object image produced by the objective optical system 48 for photography is formed on an image pickup surface 50 of a CCD 49 through a filter 51, e.g. an infrared cutoff filter. The object image received by the CCD 49 is processed in a processor 52 and displayed in the form of an electronic image on a liquid crystal display device (LCD) 60. The processor 52 also controls a recording device 61 for recording the object image detected by the CCD 49 in the form of electronic information. The image displayed on the LCD 60 is led to an observer's eyeball E through an ocular optical system 59. The ocular optical system 59 is formed from a decentered prism having a configuration similar to that used in the image-forming optical system according to the present invention. In this example, the ocular optical system 59 has three surfaces, i.e. an entrance surface 62, a reflecting surface 63, and a surface 64 serving as both reflecting and refracting surfaces. At least one of the two surfaces 63 and 64 having a reflecting action, preferably each of them, is formed from a plane-symmetry free-form surface with only one plane of symmetry that gives a power to a light beam and corrects aberrations due to decentration. The only one plane of symmetry is formed in approximately the same plane as the only one plane of symmetry of the plane-symmetry free-form surfaces in the prisms 10 and 20 of the objective optical system 48 for photography.

In the camera 40 arranged as stated above, the objective optical system 48 for photography can be constructed with a minimal number of optical members. Accordingly, a high-performance and low-cost camera can be realized. In addition, because all the constituent elements of the optical system can be arranged in the same plane, it is possible to reduce the thickness in a direction perpendicular to the plane in which the constituent elements are arranged.

Although in this example a plane-parallel plate is placed as a cover member 65 of the objective optical system 48 for photography, it is also possible to use a lens having a power as the cover member 65.

In the first prism 10 of the image-forming optical system according to the present invention, the surface closest to the object side may be used as a cover member instead of providing a cover member separately. In this case, however, the surface of the first prism 10 that is closest to the object side is the entrance surface of the first prism 10. Because the entrance surface is decentered with respect to the optical axis, if this surface is placed on the front side of the camera, it gives the illusion that the photographic center of the camera 40 is deviated from the subject when the entrance surface is seen from the subject side (the subject normally feels that photographing is being performed in a direction perpendicular to the entrance surface, as in the case of ordinary cameras). Thus, the entrance surface would give a sense of incongruity. Therefore, in a case where the surface of the image-forming optical system that is closest to the object side is a decentered surface as in this example, it is desirable to provide the cover member 65 from the viewpoint of preventing the subject from feeling incongruous when seeing the entrance surface, and allowing the subject to be photographed with the same feeling as in the case of the existing cameras.

Figure 19A:
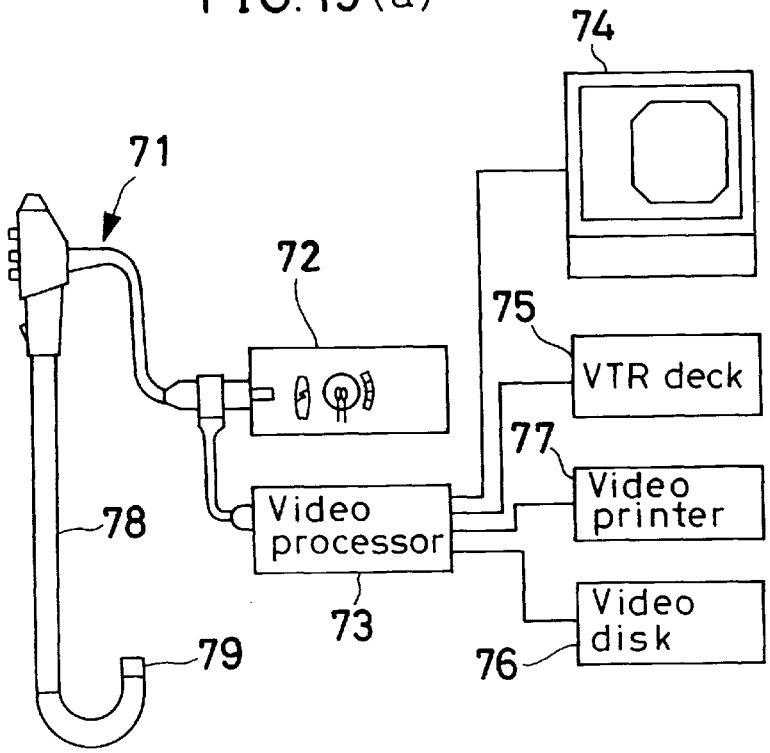
FIG. 19 is a conceptual view of a video endoscope system to which the image-forming optical system according to the present invention is applied.
Figure 19B:
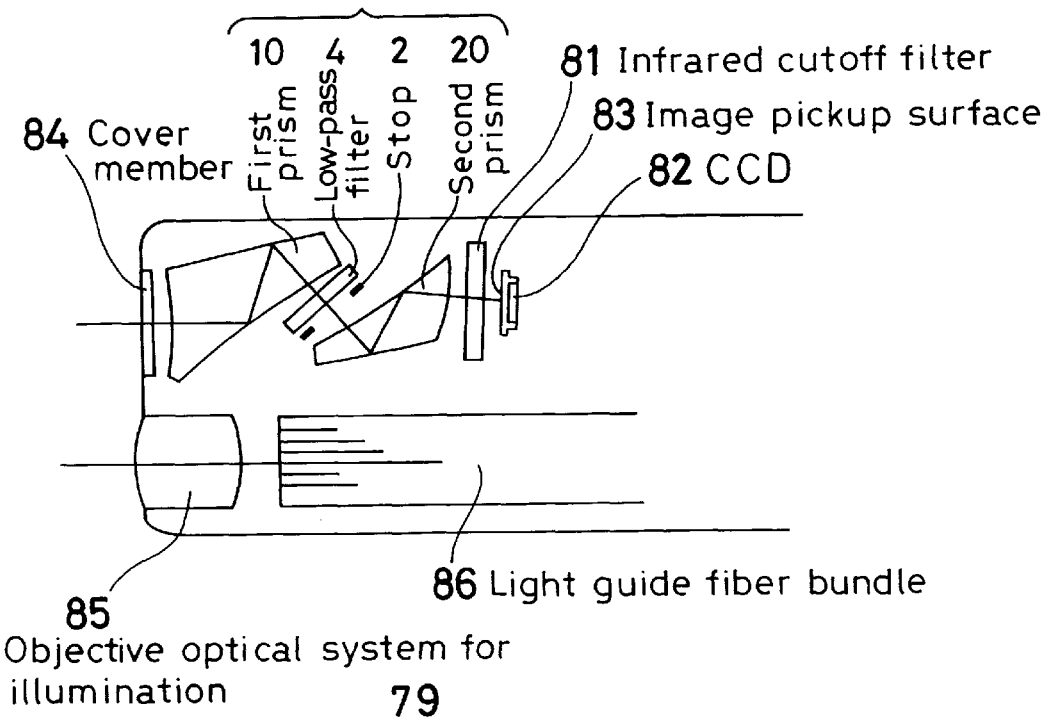

FIG. 19 is a conceptual view showing an arrangement in which the image-forming optical system according to the present invention is incorporated into an objective optical system 80 in an observation system of a video endoscope system. As shown in part (a) of FIG. 19, the video endoscope system includes a video endoscope 71, a light source unit 72 for supplying illuminating light, a video processor 73 for executing processing of signals associated with the video endoscope 71, a monitor 74 for displaying video signals outputted from the video processor 73, a VTR deck 75 and a video disk 76, which are connected to the video processor 73 to record video signals and so forth, and a video printer 77 for printing out video signals in the form of images. The video endoscope 71 has an insert part 78 with a distal end portion 79. The distal end portion 79 is arranged as shown in part (b) of FIG. 19. A light beam from the light source unit 72 passes through a light guide fiber bundle 86 and illuminates a part to be observed through an objective optical system 85 for illumination. Light from the part to be observed enters an objective optical system 80 for observation through a cover member 84. Thus, an object image is formed by the objective optical system 80. The object image is formed on an image pickup surface 83 of a CCD 82 through a filter 81, e.g. an infrared cutoff filter. Furthermore, the object image is converted into a video signal by the CCD 82. The video signal is displayed directly on the monitor 74 by the video processor 73, which is shown in part (a) of FIG. 19. In addition, the video signal is recorded in the VTR deck 75 and on the video disk 76 and also printed out in the form of an image from the video printer 77.

The endoscope arranged as stated above can be constructed with a minimal number of optical members. Accordingly, a high-performance and low-cost endoscope can be realized. Moreover, because the first prism 10 and the second prism 20, which constitute the image-forming optical system 80, are arranged in series in the direction of the longitudinal axis of the endoscope, the above-described advantageous effects can be obtained without hindering the achievement of a reduction in the diameter of the endoscope. Although in this example a plane-parallel plate is placed as the cover member 84, it is also possible to use a lens having a power as the cover member 84.

Figure 20:
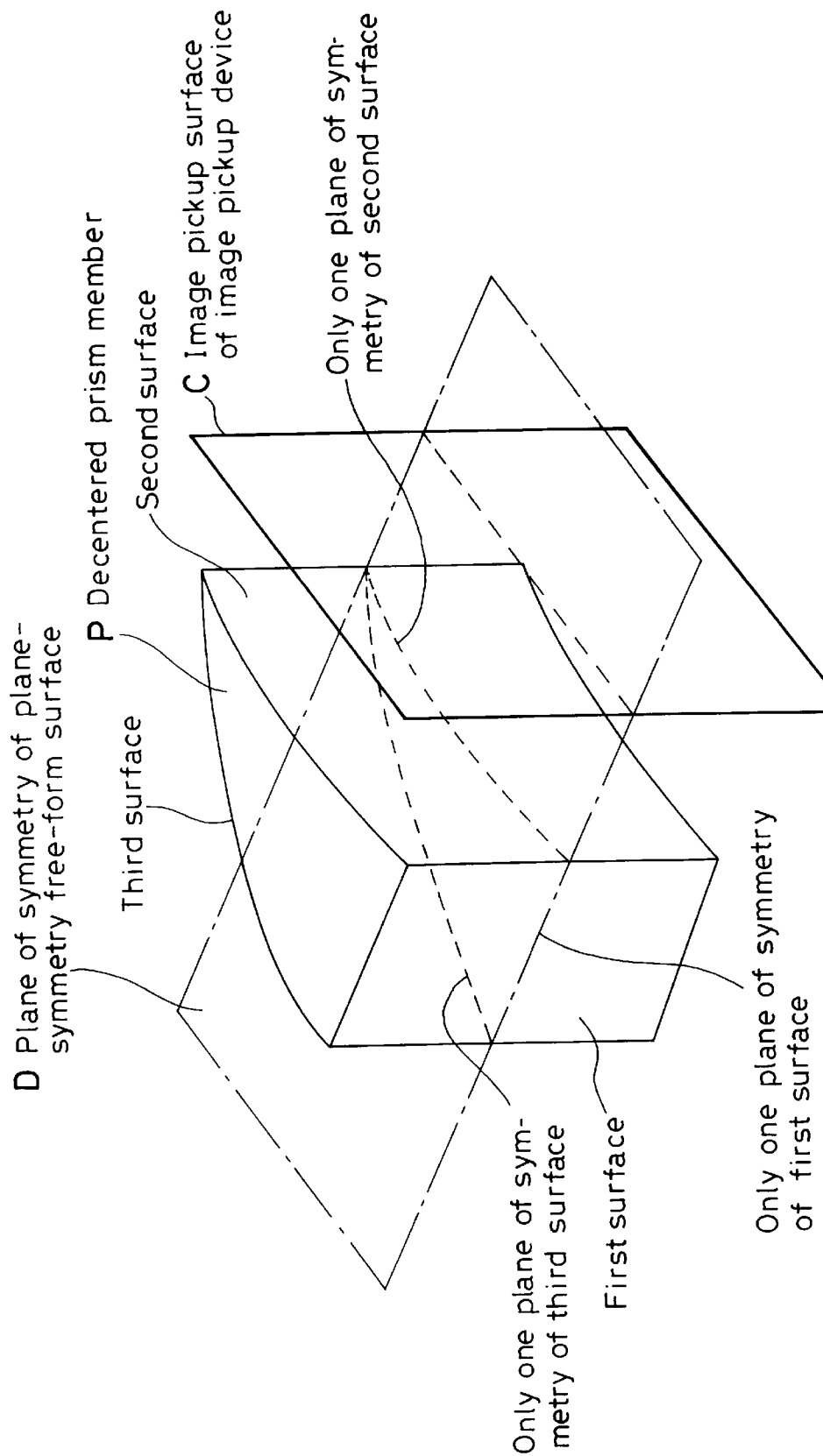
FIG. 20 is a diagram showing a desirable arrangement for the image-forming optical system according to the present invention when it is placed in front of an image pickup device.
Figure 21:
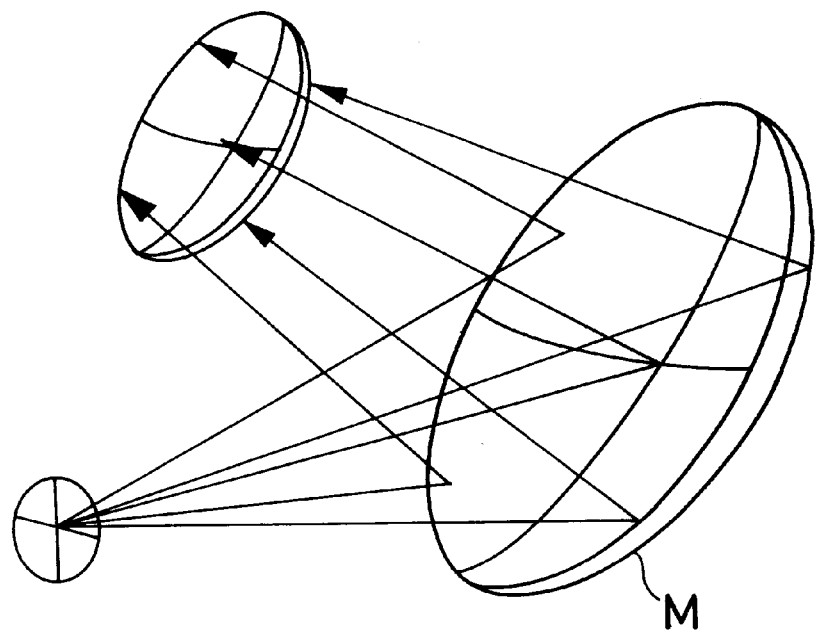
FIG. 21 is a conceptual view for describing curvature of field produced by a decentered reflecting surface.
Figure 22:
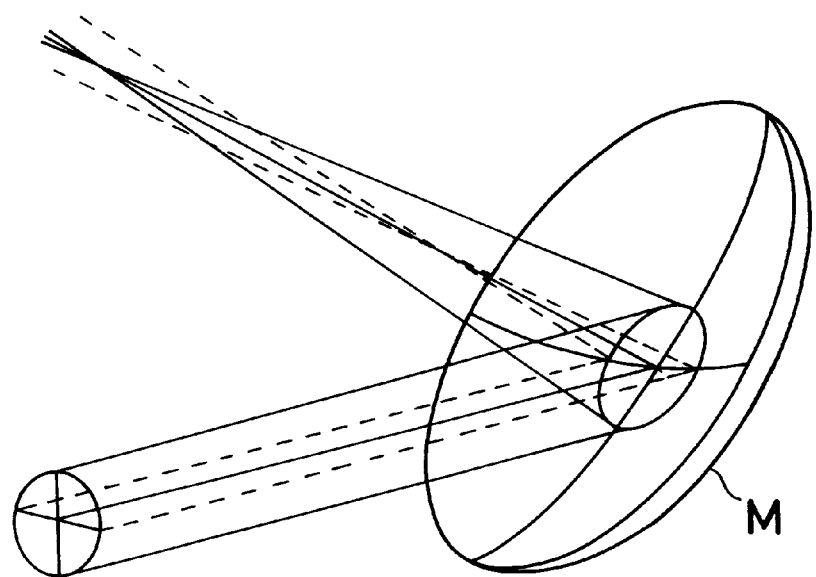
FIG. 22 is a conceptual view for describing astigmatism produced by a decentered reflecting surface.
Figure 23:
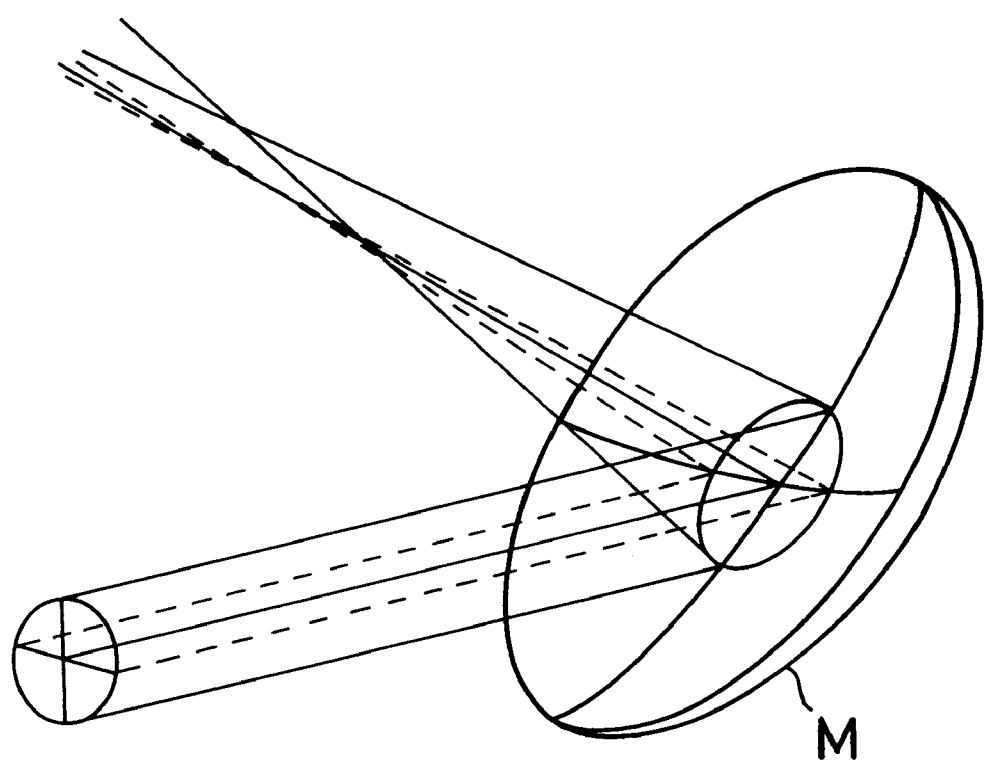
FIG. 23 is a conceptual view for describing coma produced by a decentered reflecting surface.

FIG. 20 is a diagram showing a desirable arrangement for the image-forming optical system according to Example 1 and so forth when the image-forming optical system is placed in front of an image pickup device, e.g. a CCD, or a filter. In the figure, a decentered prism P is a decentered prism placed on the object or image side of the stop in the image-forming optical system according to the present invention. When the image pickup surface C of an image pickup device forms a quadrangle as shown in the figure, it is desirable from the viewpoint of forming a beautiful image to place the decentered prism P so that the plane D of symmetry of a plane-symmetry free-form surface provided in the decentered prism P is parallel to at least one of the sides forming the quadrangular image pickup surface C.

When the image pickup surface C has a shape in which each of the four interior angles is approximately 90 degrees, such as a square or a rectangle, it is desirable that the plane D of symmetry of the plane-symmetry free-form surface should be parallel to two sides of the image pickup surface C that are parallel to each other. It is more desirable that the plane D of symmetry should lie at the middle between two parallel sides and coincide with a position where the image pickup surface C is in a symmetry between the right and left halves or between the upper and lower halves. The described arrangement enables the required assembly accuracy to be readily obtained when the image-forming optical system is incorporated into an apparatus, and is useful for mass-production.

When a plurality or all of the optical surfaces constituting the decentered prism P, i.e. the first surface, the second surface, the third surface, and so forth, are plane-symmetry free-form surfaces, it is desirable from the viewpoint of design and aberration correcting performance to arrange the decentered prism P so that the planes of symmetry of the plurality or all of the optical surfaces are in the same plane D. In addition, it is desirable that the plane D of symmetry and the image pickup surface C should be in the above-described relationship.

All the decentered prisms placed on the object and image sides of the stop in the image-forming optical systems in the above-described examples are of the type in which there are two internal reflections and which has three optical surfaces, one of which is formed from a surface having both a totally reflecting action and a transmitting action. It should, however, be noted that decentered prisms usable in the present invention are not necessarily limited to the described type.

As has been stated above, and as will be clear from the examples, the present invention makes it possible to obtain a low-cost and high-performance image-forming optical system that is made compact and thin by folding an optical path using reflecting surfaces arranged to minimize the number of reflections.

What we claim is:

1. An image-forming optical system comprising:
   a plurality of reflecting surfaces having power and a stop, wherein an optical path is folded by said reflecting surfaces, and a light beam from an object point is led to an image plane to form an image thereon, and wherein said plurality of reflecting surfaces include a first reflecting surface with a curved surface configuration having a negative power;
   a second reflecting surface with a curved surface configuration having a positive power, said second reflecting surface being placed closer to said image plane than said first reflecting surface; and
   a third reflecting surface as at least one reflecting surface placed in an optical path between said first reflecting surface and said second reflecting surface;
   wherein said third reflecting surface has a configuration that satisfies the following condition (1):

$$45° < |\theta| \tag{1}$$

where, when a light ray from an object center that passes through a center of the stop and reaches a center of the image plane is defined as an axial principal ray, θ is an angle formed between the axial principal ray and a line normal to said third reflecting surface in a decentration direction at a point where the axial principal ray intersects said third reflecting surface.

2. An image-forming optical system according to claim 1, wherein, among said reflecting surfaces having power, said first reflecting surface is placed closest to an object side of said image-forming optical system.

3. An image-forming optical system according to claim 2, wherein said first reflecting surface has a configuration that satisfies the following condition (2):

$$|\Theta n| < 45° \tag{2}$$

where Θn is an angle formed between the axial principal ray and a line normal to said first reflecting surface in the decentration direction at a point where the axial principal ray intersects said first reflecting surface.

4. An image-forming optical system according to claim 2, wherein said second reflecting surface has a configuration that satisfies the following condition (3):

$$|\Theta p| < 45° \tag{3}$$

where Θp is an angle formed between the axial principal ray and a line normal to said second reflecting surface in the decentration direction at a point where the axial principal ray intersects said second reflecting surface.

5. An image-forming optical system according to any one of claims 1 to 4, wherein said first reflecting surface is formed by a prism member.

6. An image-forming optical system according to any one of claims 1 to 4, wherein said second reflecting surface is formed by a prism member.

7. An image-forming optical system according to any one of claims 1 to 4, wherein said first reflecting surface is formed by a first prism, and said second reflecting surface is formed by a second prism.

8. An image-forming optical system according to any one of claims 1 to 4, wherein a fourth reflecting surface is placed in an optical path between said third reflecting surface and said second reflecting surface, said fourth reflecting surface having a configuration that satisfies the following condition (1):

$$45° < |\theta| \tag{1}$$

where, when a light ray from an object center that passes through a center of the stop and reaches a center of the image plane is defined as an axial principal ray, θ is an angle formed between the axial principal ray and a line normal to said fourth reflecting surface in a decentration direction at a point where the axial principal ray intersects said fourth reflecting surface.

9. An image-forming optical system according to any one of claims 1 to 4, wherein said first reflecting surface is formed from a rotationally asymmetric surface that corrects decentration aberrations.

10. An image-forming optical system according to any one of claims 1 to 4, wherein said second reflecting surface is formed from a rotationally asymmetric surface that corrects decentration aberrations.

11. An image-forming optical system according to any one of claims 1 to 4, wherein said third reflecting surface is formed from a rotationally asymmetric surface that corrects decentration aberrations.

12. An image-forming optical system according to claim 8, wherein said fourth reflecting surface is formed from a rotationally asymmetric surface that corrects decentration aberrations.

13. A photographic apparatus wherein the image-forming optical system of any one of claims 1 to 4 is placed as a photographic optical system.

14. A photographic apparatus wherein the image-forming optical system of any one of claims 1 to 4 is placed as an observation optical system.

* * * * *